United States Patent
Saito

(10) Patent No.: US 9,063,868 B2
(45) Date of Patent: Jun. 23, 2015

(54) VIRTUAL COMPUTER SYSTEM, AREA MANAGEMENT METHOD, AND PROGRAM

(75) Inventor: Masahiko Saito, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 206 days.

(21) Appl. No.: 13/508,435

(22) PCT Filed: Dec. 13, 2010

(86) PCT No.: PCT/JP2010/007226
§ 371 (c)(1),
(2), (4) Date: May 7, 2012

(87) PCT Pub. No.: WO2011/148447
PCT Pub. Date: Dec. 1, 2011

(65) Prior Publication Data
US 2012/0226849 A1    Sep. 6, 2012

(30) Foreign Application Priority Data

May 24, 2010    (JP) .................................. 2010-118613

(51) Int. Cl.
*G06F 12/10*    (2006.01)
*G06F 9/50*    (2006.01)
*G06F 11/14*    (2006.01)

(52) U.S. Cl.
CPC ............ *G06F 12/10* (2013.01); *G06F 11/1438* (2013.01); *G06F 11/1484* (2013.01); *G06F 2201/815* (2013.01); *G06F 2212/151* (2013.01); *G06F 9/5016* (2013.01)

(58) Field of Classification Search
None
See application file for complete search history.

(56) References Cited

U.S. PATENT DOCUMENTS

| | | |
|---|---|---|
| 5,345,590 A | 9/1994 | Ault et al. |
| 6,772,419 B1 | 8/2004 | Sekiguchi et al. |
| 6,996,828 B1 | 2/2006 | Kimura et al. |

(Continued)

FOREIGN PATENT DOCUMENTS

| | | |
|---|---|---|
| CN | 101493782 A | 7/2009 |
| JP | 10-240556 | 9/1998 |

(Continued)

OTHER PUBLICATIONS

International Search Report issued Feb. 8, 2011 in International (PCT) Application No. PCT/JP2010/007226.

(Continued)

*Primary Examiner* — Cheng-Yuan Tseng
*Assistant Examiner* — Tahilba Puche
(74) *Attorney, Agent, or Firm* — Wenderoth, Lind & Ponack, L.L.P.

(57) ABSTRACT

A virtual computer system having a plurality of virtual computers includes an area assignment unit operable to, when a virtual computer attempts to perform writing to a basic area which is assigned to and shared by the plurality of virtual computers, change an assignment to the virtual computer from the basic area to a copy area to which the basic area is copied and the writing is performed. Additionally an area freeing unit is operable to, when a content of the basic area matches a content of at least one copy area, change area assignment to one or more virtual computers, to which have been assigned one or more other areas than one area among the areas whose contents match each other, to the one area, and free the one or more other areas.

14 Claims, 13 Drawing Sheets

(56) References Cited

U.S. PATENT DOCUMENTS

| | | | |
|---|---|---|---|
| 7,567,188 B1 * | 7/2009 | Anglin et al. | 341/63 |
| 7,620,766 B1 * | 11/2009 | Waldspurger | 711/6 |
| 8,060,703 B1 * | 11/2011 | Desai et al. | 711/147 |
| 2001/0016879 A1 | 8/2001 | Sekiguchi et al. | |
| 2001/0025371 A1 | 9/2001 | Sato et al. | |
| 2004/0078186 A1 | 4/2004 | Nair et al. | |
| 2004/0237086 A1 | 11/2004 | Sekiguchi et al. | |
| 2005/0149933 A1 | 7/2005 | Saito et al. | |
| 2005/0216696 A1 | 9/2005 | Kawaguchi | |
| 2006/0117130 A1 | 6/2006 | Tsushima et al. | |
| 2006/0143517 A1 * | 6/2006 | Douceur et al. | 714/21 |
| 2007/0192765 A1 | 8/2007 | Shimogawa et al. | |
| 2007/0208885 A1 | 9/2007 | Otsuka | |
| 2008/0065856 A1 | 3/2008 | Kawaguchi | |
| 2008/0155537 A1 * | 6/2008 | Dinda et al. | 718/1 |
| 2009/0187903 A1 | 7/2009 | Ueda et al. | |
| 2009/0265706 A1 * | 10/2009 | Golosovker et al. | 718/1 |
| 2010/0023702 A1 * | 1/2010 | Landau et al. | 711/147 |
| 2010/0211752 A1 | 8/2010 | Otsuka | |
| 2010/0299667 A1 * | 11/2010 | Ahmad et al. | 718/1 |

FOREIGN PATENT DOCUMENTS

| | | |
|---|---|---|
| JP | 11-149385 | 6/1999 |
| JP | 2000-242512 | 9/2000 |
| JP | 3557026 | 8/2004 |
| JP | 2005-275629 | 10/2005 |
| JP | 2006-155272 | 6/2006 |
| JP | 2007-219757 | 8/2007 |
| JP | 3980538 | 9/2007 |
| JP | 2009-523269 | 6/2009 |
| JP | 2009-245216 | 10/2009 |
| WO | 2007/097123 | 8/2007 |

OTHER PUBLICATIONS

Chinese Office Action issued Dec. 31, 2014 in corresponding Chinese Application No. 201080050869.7 (with partial English translation).

* cited by examiner

FIG. 2

| VMID 51 | Logical address 52 | Physical address 53 | Share flag 54 | Write inhibit flag 55 |
|---|---|---|---|---|
| 1 | 0x00011 | 0x80001 | 1 | 1 |
| 2 | 0x00011 | 0x80001 | 1 | 1 |
| 1 | 0x00012 | 0x80002 | 0 | 1 |
| 2 | 0x00012 | 0x80005 | 0 | 1 |
| ... | ... | ... | ... | ... |

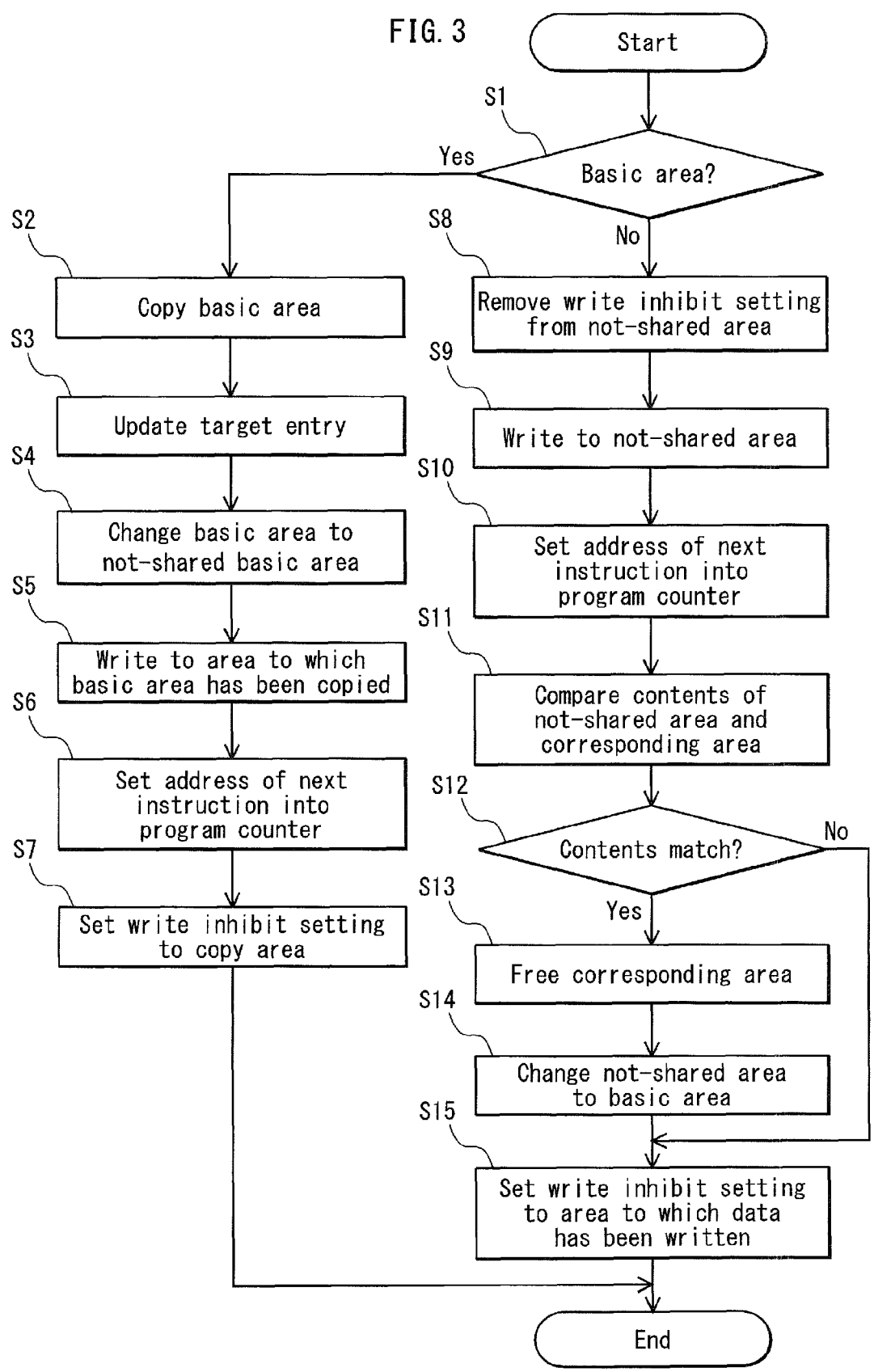

| VMID | Logical address | Physical address | Share flag | Write inhibit flag |
|---|---|---|---|---|
| 1 | 0x00011 | 0x80001 | 1 | 1 |
| 2 | 0x00011 | 0x80001 | 1 | 1 |
| 1 | 0x00012 | 0x80002 | 1 | 1 |
| 2 | 0x00012 | 0x80002 | 1 | 1 |
| ... | ... | ... | ... | ... |

5

56 57 58a 59a

| VMID | Logical address | Physical address | Share flag | Write inhibit flag |
|---|---|---|---|---|
| 1 | 0x00011 | 0x80001 | 1 | 1 |
| 2 | 0x00011 | 0x80001 | 1 | 1 |
| 1 | 0x00012 | 0x80002 | 1 | 1 |
| 2 | 0x00012 | 0x80002 | 1 | 1 |
| ... | ... | ... | ... | ... |

FIG. 8A

| VMID | Execution progress |
|---|---|
| 1 | 20% |
| 2 | 10% |

FIG. 8B

| Processor ID | Frequency | Assignment rate | VMID |
|---|---|---|---|
| 1 | 1GHz | 70% | 1 |
| 2 | 2GHz | 100% | 2 |

VIRTUAL COMPUTER SYSTEM, AREA MANAGEMENT METHOD, AND PROGRAM

BACKGROUND OF INVENTION

1. Technical Field

The present invention relates to a virtual computer system including a plurality of virtual computers, and in particular to management of memory areas that are necessary for the virtual computers to operate.

2. Background Art

There is conventionally known a system in which hardware resources are multiplexed to improve the reliability of the system (for example, Patent Literature 1).

However, in the above method, the cost for multiplexing the hardware resources is too high. In view of this, some technologies use a plurality of virtual computers to improve the reliability of the system (for example, Patent Literatures 2 through 4).

Patent Literature 2 discloses a technology for obtaining, in advance, a backup of a memory area assigned to a virtual computer, and resuming a process by restoring the backup if an abnormality such as a hardware failure or a software malfunction occurs.

Patent Literature 3 discloses a technology for, if an abnormality occurs in one of two virtual computers that are run concurrently, causing the other one of the virtual computers to continue processing.

Patent Literature 4 discloses a technology for copying the content of a memory area assigned to a current-use virtual computer to a memory area assigned to a waiting virtual computer, and if an abnormality occurs in the current-use virtual computer, causing the processing to continue by switching from the current-use virtual computer to the waiting virtual computer.

Note that, to switch between a plurality of virtual computers, in general, a software called a hypervisor is used to manage the assignment of a processor, memory and the like to the virtual computers. A general role of the hypervisor has conventionally been known (for example, Patent Literature 5), and thus detailed description thereof is omitted here.

CITATION LIST

Patent Literature

[Patent Literature 1]
  Japanese Patent Application Publication No. H10-240556
[Patent Literature 2]
  Japanese Patent Application Publication No. 2009-245216
[Patent Literature 3]
  U.S. Pat. No. 5,345,590
[Patent Literature 4]
  Japanese Patent Application Publication No. 2007-219757
[Patent Literature 5]
  Japanese Patent Application Publication No. 2000-242512

SUMMARY OF INVENTION

Meanwhile, generally, different memory areas are assigned to the plurality of virtual computers constituting the multiple-computing system. Accordingly, the multiple-computing system has a problem that the total amount of memory usage in the whole multiple-computing system increases when the virtual computers are run.

It is therefore an object of the present invention to provide a virtual computer system in which the total amount of memory usage necessary for running the virtual computers is reduced.

The above object is fulfilled by a virtual computer system having a plurality of virtual computers that are realized when a processor executes a program stored in a memory, the virtual computer system comprising: an area assignment unit operable to, when a virtual computer among the plurality of virtual computers attempts to perform writing to a basic area which is an area provided in the memory and is assigned to and shared by the plurality of virtual computers, change an area assignment to the virtual computer from the basic area to a copy area which is an area provided in the memory to which a content of the basic area is copied and the writing is performed, while keeping the basic area to be assigned to the plurality of virtual computers except for the virtual computer; and an area freeing unit operable to, when a predetermined condition, which defines a trigger to perform a comparison between the content of the basic area and a content of each of one or more copy areas, is satisfied, perform the comparison, and when the comparison results in indication of a match between the content of the basic area and a content of at least one copy area among the one or more copy areas, change area assignment to one or more virtual computers, to which have been assigned one or more other areas than one area among the areas whose contents match each other, from the one or more other areas to the one area, and free the one or more other areas.

According to the virtual computer system with the above structure, it is possible to reduce the total amount of memory usage necessary for running the virtual computers.

BRIEF DESCRIPTION OF DRAWINGS

FIG. 2 illustrates one example of the data structure and content of the page table 5.

FIG. 3 is a flowchart illustrating an exception process that is executed by the hypervisor 100 when a write inhibit violation occurs.

FIGS. 8A and 8B illustrate examples of the data structures and contents of a progress management table 20 and an assignment management table 30.

DETAILED DESCRIPTION OF INVENTION

The following describes embodiments of the present invention with reference to the attached drawings.

<<Embodiment 1>>
<Structure>

First, the structure of a virtual computer system 1000 in Embodiment 1 is described.

Figure 1:
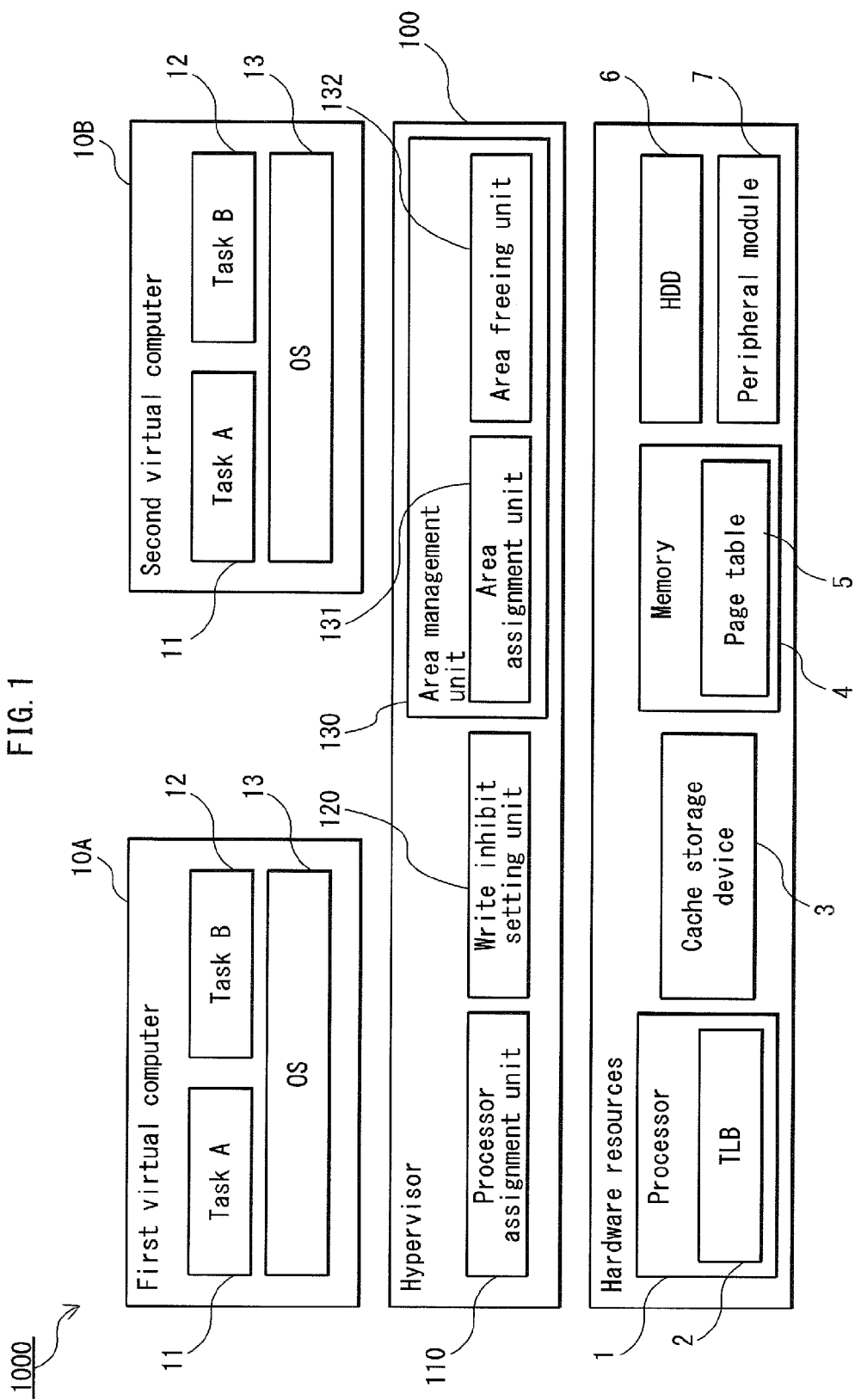
FIG. 1 is a system structure diagram of the virtual computer system 1000 in Embodiment 1.

FIG. 1 is a system structure diagram of the virtual computer system 1000.

The virtual computer system 1000 is a multiple-computing system in which a hypervisor 100, which is a basic software that runs on a hardware execution environment (hardware resources shown in FIG. 1), provides a first virtual computer 10A and a second virtual computer 10B with execution environments so that a single physical computer can be used as two virtual computers.

As shown in FIG. 1, the hardware resources include a processor 1, a cache storage device 3, memory 4, an HDD (Hard Disk Drive) 6, a peripheral module 7 and the like.

Note that the following description is given on the assumption that, as the memory management method, the virtual computer system 1000 adopts a paging based virtual memory management method.

The memory 4 is typically segmented into pages which are memory areas each of which ranges from several kilo bytes to several mega bytes in size, and mapping of logical addresses and physical addresses is performed in units of pages. Note that a page table 5 stored in the memory 4 is used for this mapping. The page table 5 is described in detail below (see FIG. 2). For example, various information are registered for each page in the page table 5, such as information indicating whether or not a setting has been done to inhibit writing to the page (hereinafter, the setting is referred to as a "write inhibit setting"), and information indicating whether or not the page is shared by virtual computers.

The processor 1 temporarily stores some of mappings obtained from the page table 5 during a process of executing a program, into a TLB (Translation Look-aside Buffer) 2.

Note that examples of the peripheral module 7 include input/output devices such as a display, a printer and a timer.

Each of the first virtual computer 10A and the second virtual computer 10B executes a process realized by a task A 11 and a task B 12 that run on an OS (Operating System) 13 (hereinafter, the process is referred to as a "particular process").

The hypervisor 100 has a function to manage the assignment of the above hardware resources to the first virtual computer 10A and the second virtual computer 10B, and includes a processor assignment unit 110, a write inhibit setting unit 120, and an area management unit 130.

The processor assignment unit 110 has a function to assign the processor 1 to the virtual computers (10A and 10B) by time sharing manner.

The write inhibit setting unit 120 has a function to set a write inhibit setting to a particular page specified by the area management unit 130, in the page table 5.

When any virtual computer attempts to write to a page to which the write inhibit setting has been set in the page table 5, it is regarded as a write-inhibit violation and an interrupt (exception) occurs. The processor 1 then sends a notification to the hypervisor 100. Note that this is realized by registering, in advance, a processing routine for handling a write-inhibit violation concerning the hypervisor 100, in a so-called interrupt vector table.

The area management unit 130 has a function to, when one of the virtual computers (10A and 10B) attempts to write and the attempt causes a write inhibit violation to occur, change a memory area (page) assigned to the virtual computer that has caused the write inhibit violation to occur. The area management unit 130 includes an area assignment unit 131 and an area freeing unit 132.

Hereinafter, at each point when a write inhibit violation occurs, a virtual computer that has attempted to write and caused the write inhibit violation may be referred to as a "target virtual computer", and the other virtual computer that is not the target virtual computer may be referred to as a "non-target virtual computer".

For example, when the first virtual computer 10A attempts to write and causes a write inhibit violation to occur, the first virtual computer 10A is the target virtual computer and the second virtual computer 10B is the non-target virtual computer; and when the second virtual computer 10B attempts to write and causes a write inhibit violation to occur, the second virtual computer 10B is the target virtual computer and the first virtual computer 10A is the non-target virtual computer.

The area management unit 130 also has a function to assign a same page (hereinafter referred to as "basic area") to both the virtual computers before the virtual computers start executing the particular process. That is to say, the basic area is shared by the virtual computers when the virtual computers start executing the particular process.

The area assignment unit 131 has a function to, when the page to which the target virtual computer attempts to write data is the basic area, change the memory area assigned to the target virtual computer from the basic area to a memory area to which the basic area is copied and the data is written (hereinafter, the memory area is referred to as a "copy area"), and update the page table 5 to indicate the status after the change. In so doing, the area assignment unit 131 instructs the write inhibit setting unit 120 to set a write inhibit setting to the copy area.

The area assignment unit 131 also updates the page table 5 to indicate that the basic area is not shared by the virtual computers. This is because, in the present embodiment, as one example, the virtual computer system 1000 has two virtual computers (10A and 10B), and when the page assigned to the target virtual computer is changed from the basic area to the copy area, the basic area is assigned only to the non-target virtual computer.

Note that hereinafter the basic area that has come to be assigned only to the non-target virtual computer is referred to as a "not-shared basic area", and when merely the term "basic area" is used, the "basic area" means an area that is shared by the virtual computers.

Note also that hereinafter, for one of a copy area and a not-shared basic area from which the copy area is copied, the other area is referred to as a "corresponding area". That is to say, the corresponding area to the copy area is the not-shared basic area from which the copy area is copied, and the corresponding area to the not-shared basic area is the copy area to which the not-shared basic area is copied.

The area freeing unit 132 has a function to, when the page to which the target virtual computer attempts to write data is the copy area or the not-shared basic area (hereinafter the copy area and the not-shared basic area are generically referred to as "not-shared area"), compare the content of the not-shared area after writing with the content of the corresponding area, and when they match, change the memory area assigned to the non-target virtual computer from the corresponding area to the not-shared area, free the corresponding area, and update the page table 5 to indicate the status after the change.

<Data>

The following describes data used by the virtual computer system 1000 with reference to FIG. 2.

FIG. 2 illustrates one example of the data structure and content of the page table 5.

As shown in FIG. 2, the page table 5 is information associating each page assigned to the virtual computers with a VMID 51, a logical address 52, a physical address 53, a share flag 54, and a write inhibit flag 55.

Hereinafter, each set of information composed of a VMID, a logical address, a physical address, a share flag, and a write inhibit flag, associated with a page, is called an "entry".

The area management unit 130 and the write inhibit setting unit 120 register entries in the page table 5 before the virtual computers start executing the particular process, and update entries in the page table 5 when a write inhibit violation occurs.

The VMID 51 is identification information identifying a virtual computer to which the associated page is assigned. In this example, "1" is used as identification information of the first virtual computer 10A and "2" is used as identification information of the second virtual computer 10B, as one example.

The logical address 52 indicates an address of the associated page in a virtual memory. The physical address 53 indicates an address (real address) of the associated page in the memory 4. Note that, when 4-KB pages are used, the page table does not need to store lower 12 bits of each address, and thus in this example, the logical address 52 and the physical address 53 show only upper 20 bits.

The share flag 54 is a flag that indicates whether or not the associated page is shared by the virtual computers. In this example, the flag is set to "1" when the associated page is shared by the virtual computers, and to "0" when the associated page is not shared by the virtual computers.

Note that, since only the basic area can be shared by the virtual computers, when the share flag 54 is set to "1", it indicates that the associated page is the basic area; and when the share flag 54 is set to "0", it indicates that the associated page is the copy area or the not-shared basic area.

The write inhibit flag 55 is a flag that indicates whether or not the write inhibit setting is set to the associated page. In this example, the write inhibit flag 55 is set to "1" when the write inhibit setting is set to the associated page, and to "0" when the write inhibit setting is not set to the associated page.

For example, an entry 56 shown in FIG. 2 indicates that, with regard to a page assigned to a virtual computer whose VMID is "1" (namely, the first virtual computer 10A), a logical address of the associated page is "0x00011", a physical address of the associated page is "0x80001", the share flag is set to "1" (indicating that the associated page is shared by the virtual computers), and the write inhibit flag 55 is set to "1" (indicating that the write inhibit setting is set to the associated page).

Note that the area management unit 130 registers entries in the page table 5 in units of two entries, like entries 56 and 57, that are different only in VMID and are the same in the other information, in particular, the share flags being set to "1". The area management unit 130 registers such two entries for each basic area, in the page table 5.

Hereinafter, an entry in the page table 5 associated with a page to which the target virtual computer attempts to write is referred to as a "target entry", and an entry that contains a logical address that is the same as that of the target entry and contains a VMID that is different from that of the target entry is referred to as a "corresponding entry".

Note that how to update entries that have been registered in the page table 5 is described in detail below in the description of the operation of the virtual computer system 1000.

<Operation>

The following describes the operation of the virtual computer system 1000 with reference to FIG. 3.

FIG. 3 is a flowchart illustrating an exception process that is executed by the hypervisor 100 when a write inhibit violation occurs.

When a write inhibit violation occurs, the area management unit 130 of the hypervisor 100 judges, based on the page table 5, whether or not the page to which the target virtual computer has attempted to write is the basic area (step S1).

More specifically, the area management unit 130 obtains a share flag from the target entry in the page table 5, namely, an entry containing the VMID of the target virtual computer and a logical address of a page including a logical address to which the target virtual computer has attempted to write. When the obtained share flag is set to "1" (indicating that the associated page is shared by the virtual computers), the area management unit 130 judges that the page to which the target virtual computer has attempted to write is the basic area (step S1: Yes). On the other hand, when the obtained share flag is set to "0" (indicating that the associated page is a not-shared area), the area management unit 130 judges that the page to which the target virtual computer has attempted to write is not the basic area (step S1: No).

When the area management unit 130 judges that the page to which the target virtual computer has attempted to write is the basic area (step S1: Yes), the area assignment unit 131 of the area management unit 130 copies the basic area (step S2), and updates the target entry in the page table 5 so that the target entry is associated with the area to which the basic area is copied (step S3).

More specifically, the area assignment unit 131 updates the target entry in the page table 5 by changing the physical address to a physical address indicating the start of the area to which the basic area has been copied, setting the share flag to "0", and setting the write inhibit flag to "0" temporarily. It should be noted here that the write inhibit flag is set to "0" temporarily because writing is performed in step S5 later.

The area assignment unit 131 changes the basic area to the not-shared basic area (step S4). More specifically, the area assignment unit 131 updates the share flag of the corresponding entry in the page table 5 to "0".

The area assignment unit 131 writes the data, which has been attempted to be written to the basic area by the target virtual computer, to the area to which the basic area has been copied in step S2 (step S5).

The area assignment unit 131 sets the program counter to indicate an instruction that is to be executed next after a write instruction that has caused the write inhibit violation to occur, in the program that the target virtual computer is running (step S6).

The area assignment unit 131, via the write inhibit setting unit 120, sets a write inhibit setting to the area to which the data has been written in step S5 (namely, the copy area) (step S7). More specifically, the area assignment unit 131 updates the write inhibit flag, which has been temporarily updated to "0" in step S3, to "1" again.

Upon completion of the process of step S7, the area management unit 130 ends the exception process. Subsequently, the target virtual computer resumes the process from the instruction that is to be executed next after the write instruction that has caused the write inhibit violation to occur.

Note that, since the write inhibit flag has been updated to "1" again in step S7, a write inhibit violation occurs when an attempt is made to write to the copy area.

The execution of the processes of steps S1 through S7 has changed the status from the previous status where the basic area was assigned to the target virtual computer and the non-target virtual computer, to the status where the copy area is assigned to the target virtual computer and the not-shared basic area is assigned to the non-target virtual computer.

On the other hand, when the area management unit 130 judges that the page to which the target virtual computer has attempted to write is not the basic area, namely, that the page is the not-shared area (the copy area or the not-shared basic area) (step S1: No), the area freeing unit 132 temporarily removes the write inhibit setting from the not-shared area to which the target virtual computer has attempted to write (step S8). More specifically, the area freeing unit 132 updates the write inhibit flag of the target entry in the page table 5 to "0".

The area freeing unit 132 writes the data, which has been attempted to be written to the not-shared area by the target virtual computer, to the not-shared area (step S9), and as in the case of step S6, sets the program counter (step S10).

Since the virtual computers execute, concurrently, the particular process associated with the same program, when the execution progresses of the particular process in the virtual computers do not differ to a large extent, and a hardware failure or a software malfunction has not occurred, there is a high possibility that the content of the not-shared area that has been written in step S9 matches the content of the corresponding area.

For this reason, the area freeing unit 132 compares the content of the not-shared area that has been written in step S9 with the content of the corresponding area (step S11), and judges whether or not the both contents match (step S12). When it judges that the contents match (step S12: Yes), the area freeing unit 132 frees the corresponding area, namely, changes the corresponding area to an unused area (step S13).

Also, the area freeing unit 132 changes the not-shared area, to which data has been written in step S9, to the basic area (step S14). More specifically, the area freeing unit 132 updates the share flag of the target entry in the page table 5 to "1", and updates the physical address of the corresponding entry in the page table 5 to be the same as the physical address of the target entry, and updates the share flag to "1".

The execution of the processes of steps S12 through S14 has changed the status from the previous status where the copy area and the not-shared basic area, which are different in physical address, were assigned to the target virtual computer and the non-target virtual computer, respectively, to the status where the basic area is assigned to both the target virtual computer and the non-target virtual computer.

Upon completion of the process of step S14, the area freeing unit 132 sets a write inhibit setting to the area to which data has been written in step S9, namely, the basic area which has been changed from the not-shared area in step S14 (step S15). That is to say, the area freeing unit 132 sets the write inhibit flag of the target entry to "1" and ends the exception process.

When it is judged that the content of the not-shared area that has been written in step S9 does not match the content of the corresponding area (step S12: No), the area freeing unit 132 sets a write inhibit setting to the area to which data has been written in step S9, namely the not-shared area, as above (step S15) and ends the exception process.

<Specific Example>

The following describes the exception process executed by the hypervisor 100 when a write inhibit violation occurs, by using a specific example illustrated in FIGS. 4A through 6B, with reference to the flowchart illustrated in FIG. 3.

Figures 4A, 4B:
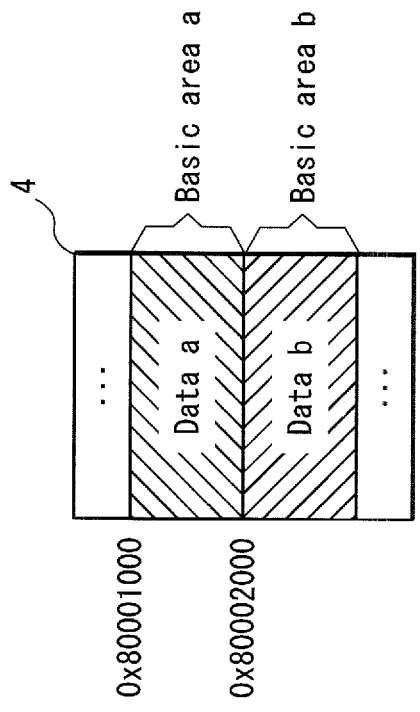
FIGS. 4A and 4B illustrate an example of a content of the page table 5 immediately before the virtual computers start executing the particular process, and an example of assignment of areas of the memory 4 to the virtual computers.

FIG. 4A illustrates an example of a content of the page table 5 immediately before the virtual computers start executing the particular process. FIG. 4B illustrates an example of assignment of areas of the memory 4 to the virtual computers as of the time of FIG. 4A.

Each of memory areas of the memory 4 associated with the entries 56 and 57 illustrated in FIG. 4A is a basic area "a" illustrated in FIG. 4B. Each of memory areas of the memory 4 associated with entries 58a and 59a illustrated in FIG. 4A is a basic area b illustrated in FIG. 4B.

Note that, in the following explanation, the entire data stored in the basic area "a" is called "Data a" and the entire data stored in the basic area b is called "Data b".

<Writing to Basic Area b>

First, the exception process executed by the hypervisor 100 is explained by taking, as an example, a case where a write inhibit violation occurs when the second virtual computer 10B attempts to write to the basic area b.

When a write inhibit violation occurs, the area management unit 130 of the hypervisor 100 judges, based on the page table 5, whether or not the page to which the target virtual computer (in this example, the second virtual computer 10B) attempts to write is the basic area (step S1).

In this example, the share flag of the target entry 59a is set to "1", thus the area management unit 130 judges that the page to which the target virtual computer has attempted to write is the basic area (step S1: Yes), and copies the basic area (step S2). It is assumed here that the physical address of the area to which the basic area is copied is "0x80005000".

Subsequently, the area management unit 130 updates the physical address of the target entry 59a to a physical address (0x80005) of the area to which the basic area is copied, the share flag to "0", and the write inhibit flag to "0" temporarily (step S3), and updates the share flag of the corresponding entry 58a to "0" (step S4).

The area assignment unit 131 writes the data, that the target virtual computer has attempted to write to the basic area b, to the area to which the basic area has been copied in step S2 (step S5). Note that, in the present description, the entire data stored in the copy area after the writing is called "Data c".

The area assignment unit 131 sets the program counter to indicate an instruction that is to be executed next (step S6), and, via the write inhibit setting unit 120, updates the write inhibit flag of the target entry 59a to "1" again and ends the exception process.

Figures 5A, 5B:
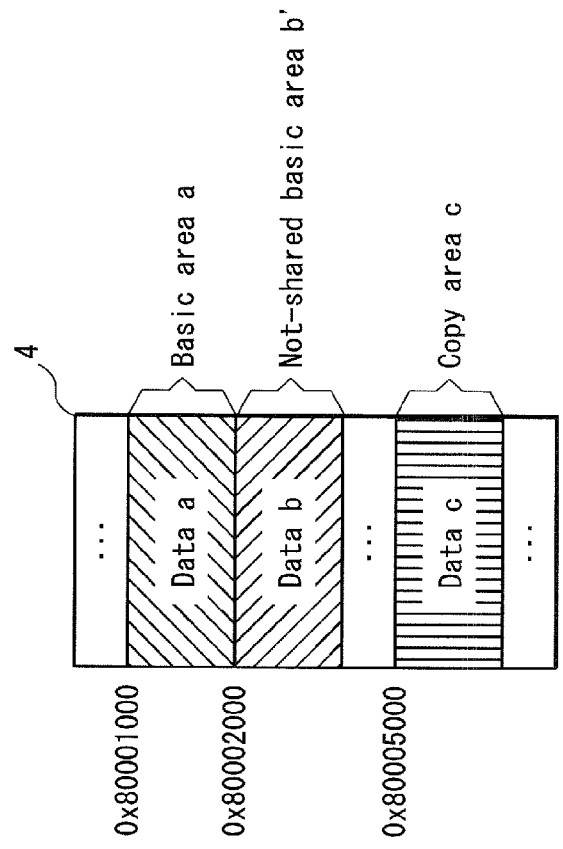
FIGS. 5A and 5B illustrate an example of the content of the page table 5 immediately after the end of the exception process that was executed because the write inhibit violation occurred to the basic area b, and an example of assignment of areas of the memory 4 to the virtual computers.

FIG. 5A illustrates an example of the content of the page table 5 immediately after the end of the exception process that was executed because the write inhibit violation occurred to the basic area b. FIG. 5B illustrates an example of assignment of areas of the memory 4 to the virtual computers as of the time of FIG. 5A.

With the execution of the exception process due to the write inhibit violation having occurred to the basic area b, the entry 58a illustrated in FIG. 4A is updated to the entry 58b illustrated in FIG. 5A, and the entry 59a illustrated in FIG. 4A is updated to the entry 59b illustrated in FIG. 5A.

As shown in FIG. 5B, the basic area b illustrated in FIG. 4B has been updated to a not-shared basic area b', and a copy area c has been generated.

<Writing to Not-Shared Basic Area b'>

The following describes the exception process executed by the hypervisor 100, by taking, as an example, a case where a write inhibit violation occurs when the first virtual computer 10A attempts to write to the not-shared basic area b'.

When a write inhibit violation occurs, the area management unit 130 of the hypervisor 100 judges whether or not the page to which the target virtual computer (in this example, the first virtual computer 10A) has attempted to write (in this example, the not-shared basic area b') is the basic area, and in this example, judges that the page is not the basic area (step S1: No), and the area freeing unit 132 updates the write inhibit flag of the target entry 58b illustrated in FIG. 5A to "0" (step S8), and performs the writing (step S9). Note that, in the following explanation, the entire data stored in the not-shared basic area b' is called "Data c".

The area freeing unit 132 sets the program counter to indicate an instruction to be executed next (step S10), compares the content of the not-shared basic area b' with the content of the corresponding area (in this example, the copy area c) (step S11), and, in this example, judges that the both contents match (step S12: Yes), and frees the corresponding area (the copy area c) (step S13).

Also, the area freeing unit 132 changes the not-shared basic area b' to the basic area b (step S14). That is to say, the area freeing unit 132 updates the share flag of the target entry 58b in the page table 5 to "1", and updates the physical address of the corresponding entry 59b to be the same as the physical address (0x80002) of the target entry 58b, and updates the share flag to "1".

The area freeing unit 132 sets the write inhibit flag of the target entry 58b to "1" (step S15) and ends the exception process.

Figures 6A, 6B:
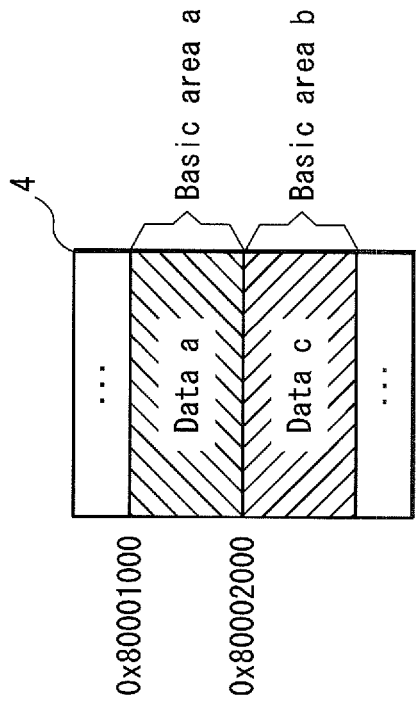
FIGS. 6A and 6B illustrate an example of the content of the page table 5 immediately after the end of the exception process that was executed because the write inhibit violation occurred to the not-shared basic area b', and an example of assignment of areas of the memory 4 to the virtual computers.

FIG. 6A illustrates an example of the content of the page table 5 immediately after the end of the exception process that was executed because the write inhibit violation occurred to the not-shared basic area b'. FIG. 6B illustrates an example of assignment of areas of the memory 4 to the virtual computers as of the time of FIG. 6A.

With the execution of the exception process due to the write inhibit violation having occurred to the not-shared basic area b', the entry 58b illustrated in FIG. 5A is updated to the entry 58a illustrated in FIG. 6A, and the entry 59b illustrated in FIG. 5A is updated to the entry 59a illustrated in FIG. 6A.

As shown in FIG. 6B, the not-shared basic area b' illustrated in FIG. 5B has been updated to the basic area b, and the copy area c has been freed.

As described above, when the second virtual computer 10B attempts to write to the basic area b, the copy area c is assigned temporarily, and thus the amount of memory usage increases temporarily. However, when the first virtual computer 10A writes to the not-shared basic area b' and the content of the not-shared basic area b' and the content of the copy area c match, the copy area c that has been assigned temporarily is freed. With this structure, it is possible to reduce the total amount of memory usage even during execution of the particular process by the virtual computers.

<<Embodiment 2>>

In recent years, some of general system LSIs (Large Scale Integration) have two or more processor cores. In view of this, the following describes an example of a virtual computer system using a multi-core processor, centering on the differences from Embodiment 1.

<Structure>

First, the structure of a virtual computer system 1100 in Embodiment 2 is described.

Figure 7:
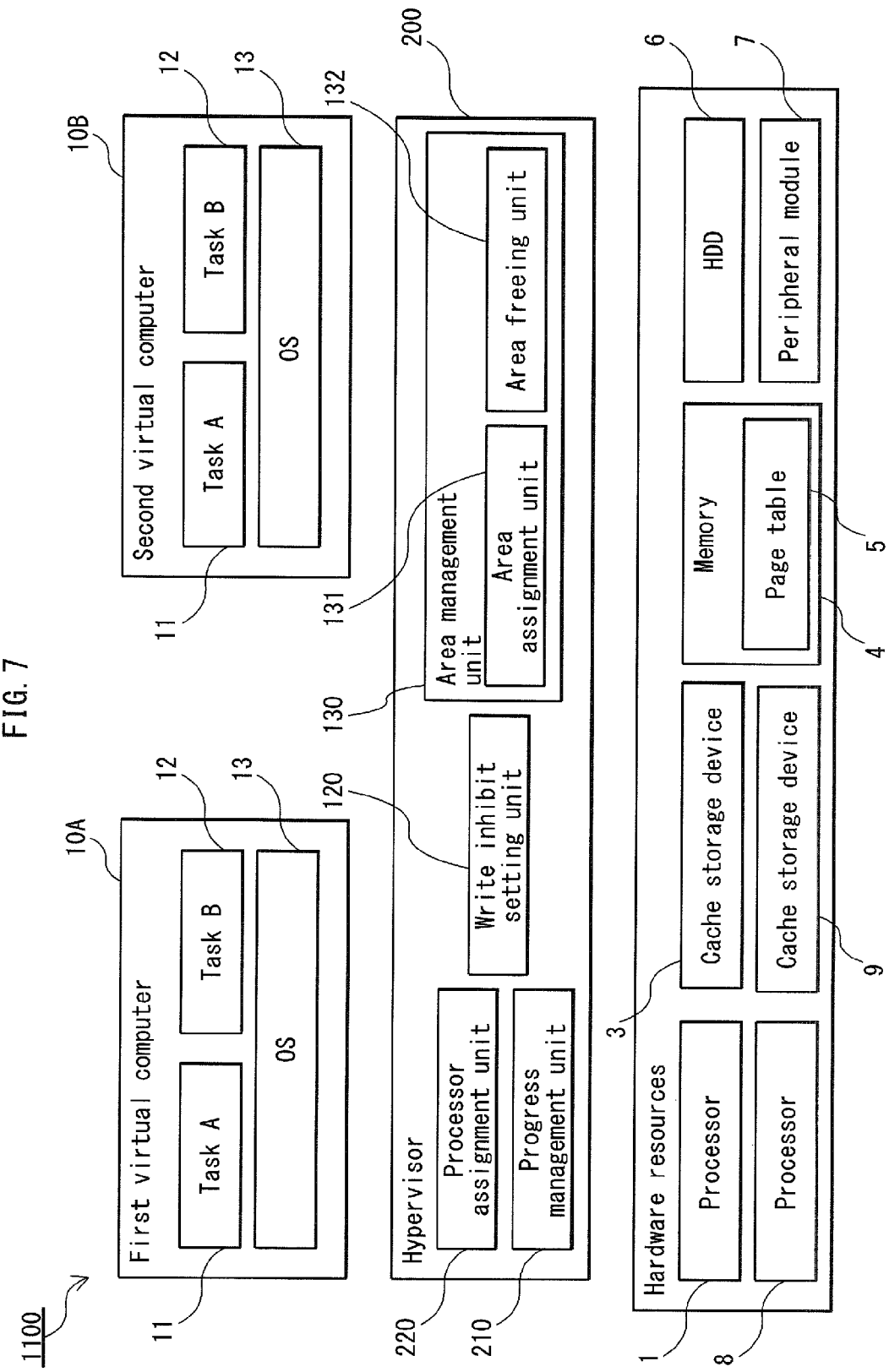
FIG. 7 is a system structure diagram of the virtual computer system 1100 in Embodiment 2.

FIG. 7 is a system structure diagram of the virtual computer system 1100.

As shown in FIG. 7, the virtual computer system 1100 includes a processor 8 and a cache storage device 9 for the processor 8, in addition to the hardware resources included in the virtual computer system 1000 of Embodiment 1.

The processor 8 and the processor 1 have the same instruction set, but are different from each other in clock frequency and the like. Note that, although not illustrated specifically, the processor 8, as the processor 1, has a TLB, and temporarily stores some of mappings obtained from the page table 5 during a process of executing a program, into the TLB.

Also, although not illustrated specifically, the cache storage device 3 and the cache storage device 9 have a mechanism (a so-called "snoop cache function") for mutually guaranteeing the consistency of the data stored therein.

The virtual computer system 1100 includes a hypervisor 200 instead of the hypervisor 100 provided in the virtual computer system 1000.

The hypervisor 200, as is the case of the hypervisor 100, has a function to manage the assignment of the above hardware resources to the first virtual computer 10A and the second virtual computer 10B, but differs from the hypervisor 100 particularly in that it assigns the processors to the virtual computers so that there is as little difference as possible between execution progresses of the particular process in the virtual computers.

The present embodiment provides one example wherein, to make as little difference as possible between execution progresses of the particular process in the virtual computers, the hypervisor 200 assigns a processor with higher performance to a virtual computer that is slower in execution progress. How to evaluate the performance of the processors is described below.

The hypervisor 200 includes a processor assignment unit 220 instead of the processor assignment unit 110 provided in the hypervisor 100, and further includes a progress management unit 210.

The progress management unit 210 has a function to manage the execution progress of the particular process in the virtual computers (10A and 10B). The progress management unit 210 repeatedly identifies a virtual computer that is slower, among the virtual computers, in execution progress of the particular process, and each time the identified virtual computer changes, notifies the processor assignment unit 220 of the change.

The processor assignment unit 220, as is the case of the processor assignment unit 110 in Embodiment 1, has a function to assign the processors (1 and 8) to the virtual computers, but differs from the processor assignment unit 110 in that it assigns, based on the notification from the progress management unit 210, a processor with higher performance, which is either of the processors (1 and 8), to a virtual computer that is slower in execution progress of the particular process.

<Data>

The following describes data used by the virtual computer system 1100 with reference to FIGS. 8A and 8B.

FIG. 8A illustrates one example of the data structure and content of a progress management table 20. FIG. 8B illustrates one example of the data structure and content of an assignment management table 30.

First, an explanation is given of the progress management table 20.

The progress management table 20 is stored in the memory 4, is a table updated by the progress management unit 210, and, as shown in FIG. 8A, is information associating each virtual computer with a VMID 21 and an execution progress 22.

The VMID 21 is identification information identifying an associated virtual computer. In this example, as is the case with the VMID 51 of the page table 5 explained in Embodiment 1, "1" is used as identification information of the first virtual computer 10A and "2" is used as identification information of the second virtual computer 10B, as one example.

The execution progress 22 is information indicating the execution progress of the particular process in the associated virtual computer.

For example, the progress management table 20 illustrated in FIG. 8A indicates that, in a virtual computer whose VMID is "1" (namely, the first virtual computer 10A), the execution progress of the particular process is "20%".

It should be noted here that, in the present embodiment, a plurality of check points are set in the program for executing the particular process in advance, and each time an execution of the particular process in the virtual computers reaches any of the check points, the progress management unit 210 updates the progress management table 20 to indicate an execution progress that has been set to the check point in advance.

Note that this is realized by calling at each check point a routine for updating the progress management table 20, with a parameter that is data indicating an execution progress having been set to the check point in advance.

Accordingly, the designer of the program for executing the particular process needs to set an execution progress to each check point in advance. For example, the designer sets check points to respective positions of process completion levels 10%, 20%, . . . 90% in execution of the whole particular process, and sets execution progresses to these check points. For example, the designer sets execution progress "10%" to a check point at an execution position of process completion level 10%, and sets execution progress "20%" to a check point at an execution position of process completion level 20%.

Note that, as in the above example, when a relatively small number of check points are set, there may be a case where execution progresses of the virtual computers in the progress management table 20 are the same. In that case, the progress management unit 210 may identify either of the virtual computers (for example, the first virtual computer 10A) as a virtual computer that is slower in execution progress of the particular process.

Next, an explanation is given of the assignment management table 30.

The assignment management table 30 is stored in the memory 4, is a table updated by the processor assignment unit 220, and, as shown in FIG. 8B, is information associating each processor with a processor ID 31, a frequency 32, an assignment rate 33, and a VMID 34.

The processor ID 31 is identification information identifying an associated processor. In this example, "1" is used as identification information of the processor 1 and "2" is used as identification information of a processor 8, as one example.

The frequency 32 is information indicating a clock frequency of the associated processor. The assignment rate 33 is information indicating what rate of the associated processor can be assigned to execution of the particular process.

The VMID 34 is identification information identifying a virtual computer to which the associated processor is assigned, and matches any of the VMIDs indicated in the progress management table 20.

For example, the assignment management table 30 illustrated in FIG. 8B indicates that a processor whose processor ID is "1" (namely, the processor 1) has "1 GHz" frequency and "70%" assignment rate, and the processor is assigned to a virtual computer whose VMID is "1" (namely, the first virtual computer 10A).

Note that, in the present embodiment, it is assumed that the greater the product of the clock frequency and the assignment rate of a processor is, the higher the performance of the processor is. In this example of the assignment management table 30, a value (2 GHz×1.0) indicating the performance of the processor 8 whose processor ID is "2" is greater than a value (1 GHz×0.7) indicating the performance of the processor 1 whose processor ID is "1", and thus the processor 8 has higher performance than the processor 1.

The processor assignment unit 220 assigns a processor with higher performance (in this example, the processor 8) to a virtual computer (10A or 10B) that is slower in execution progress and has been notified from the progress management unit 210, and each time the assignment status changes, updates the VMID in the assignment management table 30 to reflect the status change.

As described above, the processor assignment unit 220 performs a control so that there is as little difference as possible between execution progresses of the particular process in the virtual computers, by assigning a processor with higher performance to a virtual computer that is slower in execution progress. This structure increases the possibility that the virtual computers can share a memory area in the memory 4, and makes it possible to reduce the total amount of memory usage even during execution of the particular process by the virtual computers.

<Operation>

The exception process executed by the hypervisor 200 when a write inhibit violation occurs is similar to the exception process executed by the hypervisor 100 in Embodiment 1 (see FIG. 3), and thus description thereof is omitted.

<<Embodiment 3>>

According to the example provided in Embodiment 1, the hypervisor 100 sets a write inhibit setting to the copy area and the not-shared basic area, and when a write inhibit violation occurs to the not-shared area (the copy area or the not-shared basic area), compares the content of the not-shared area with the content of the corresponding area.

However, with this method, the write inhibit violation might occur frequently, and the speeds of the virtual computers executing the particular process might be decreased.

In view of this, the present embodiment provides an example where the comparison is performed at regular intervals, not each time a write inhibit violation occurs. The following describes the example centering on the differences from Embodiment 1.

<Structure>

First, the structure of a virtual computer system 1200 in Embodiment 3 is described.

Figure 9:
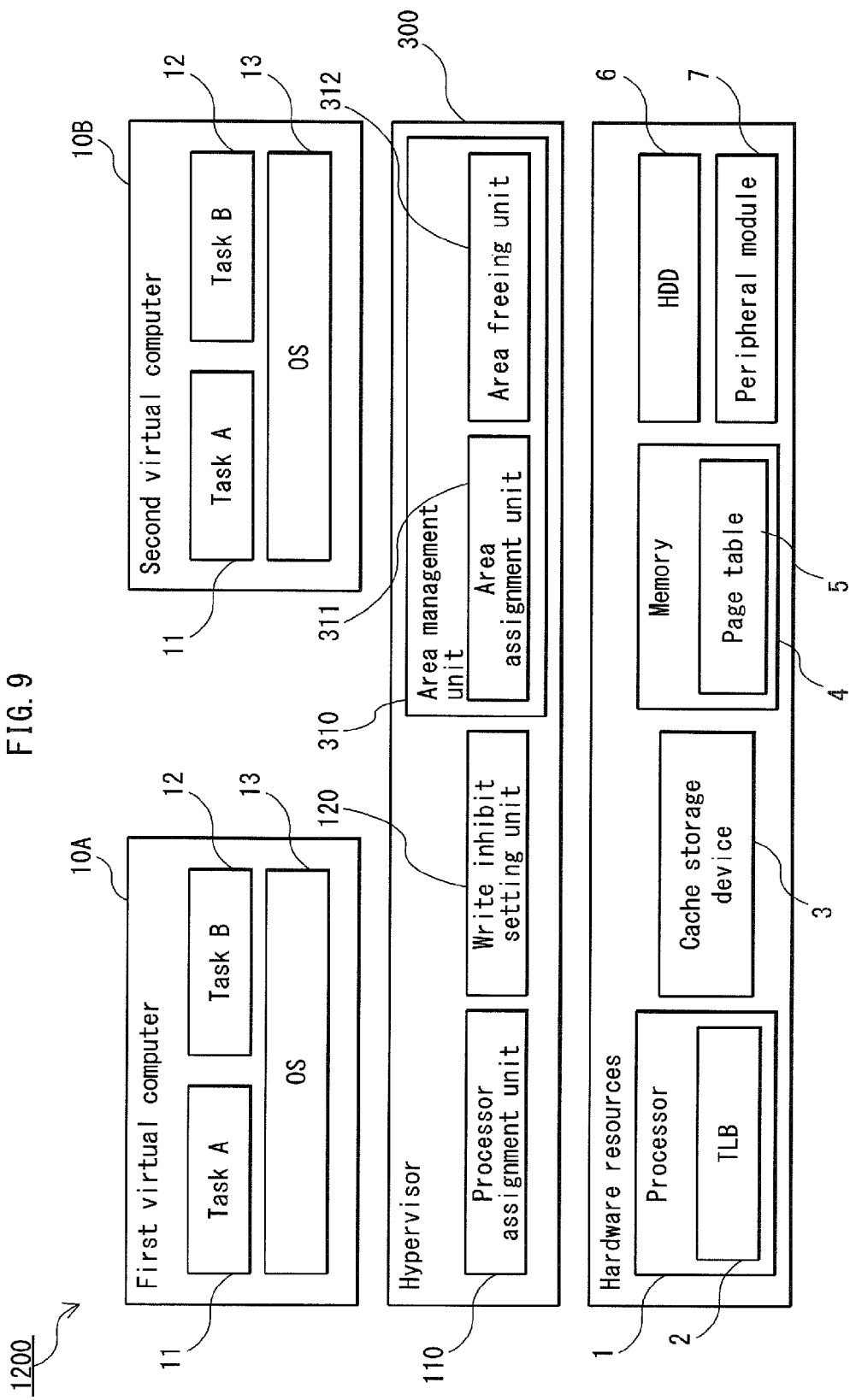
FIG. 9 is a system structure diagram of the virtual computer system 1200 in Embodiment 3.

FIG. 9 is a system structure diagram of the virtual computer system 1200.

As shown in FIG. 9, the virtual computer system 1200 includes a hypervisor 300 instead of the hypervisor 100 provided in the virtual computer system 1000 of Embodiment 1.

The hypervisor 300 includes an area management unit 310 instead of the area management unit 130 provided in the hypervisor 100, wherein the area management unit 310 includes an area assignment unit 311 and an area freeing unit 312.

The area assignment unit 311, as is the case of the area assignment unit 131 in Embodiment 1, has a function to, when the page to which the target virtual computer attempts to write data is the basic area, change the page assigned to the target virtual computer from the basic area to the copy area, and update the page table 5 to indicate the status after the change, but differs from the area assignment unit 131 in that it does not set a write inhibit setting to the copy area (namely, it does not instruct the write inhibit setting unit 120 to set a write inhibit setting to the copy area), and removes a write inhibit setting from the not-shared basic area.

The area freeing unit 312 has a function to compare the content of each not-shared area (the copy area or the not-shared basic area) assigned to one virtual computer, with the content of the corresponding area assigned to the other virtual computer, at regular intervals. When they match, the area freeing unit 312 changes the page assigned to the other virtual computer from the corresponding area to the not-shared area assigned to the one virtual computer, frees the corresponding area, and updates the page table 5 to indicate the status after the change.

Note that, since the above comparison is performed at regular intervals by the area freeing unit 312, the present embodiment is assumed to use an interrupt received from a timer (included in the peripheral module 7) that measures a constant time period repeatedly.

<Operation>

Figure 10:
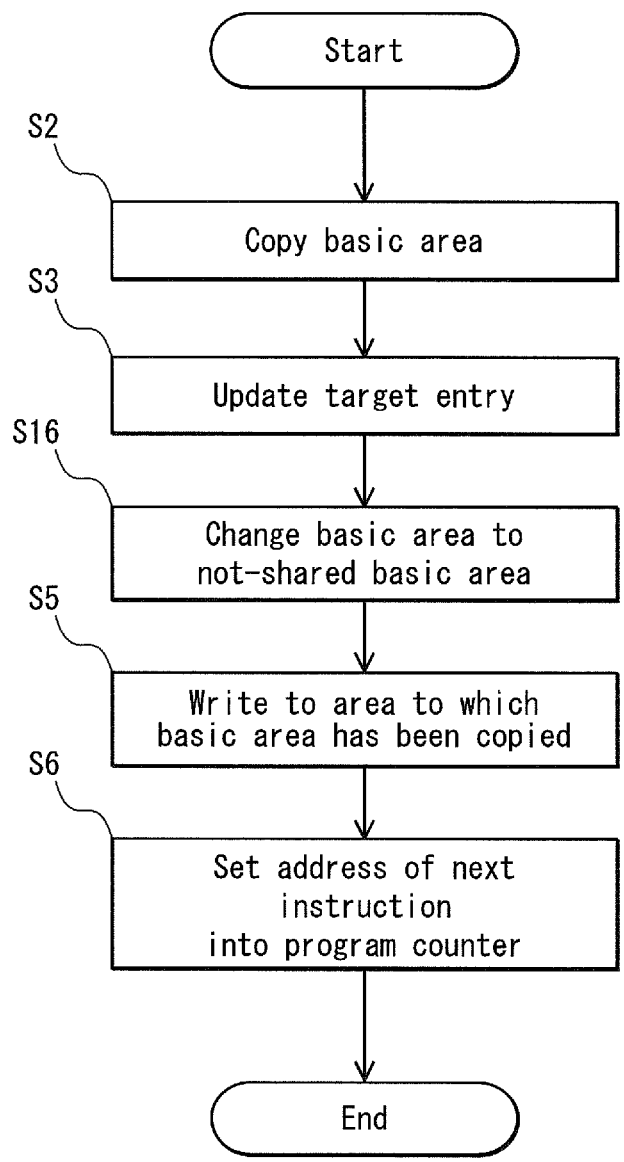
FIG. 10 is a flowchart illustrating the exception process executed by the hypervisor 300 when a write inhibit violation occurs.
Figure 11:
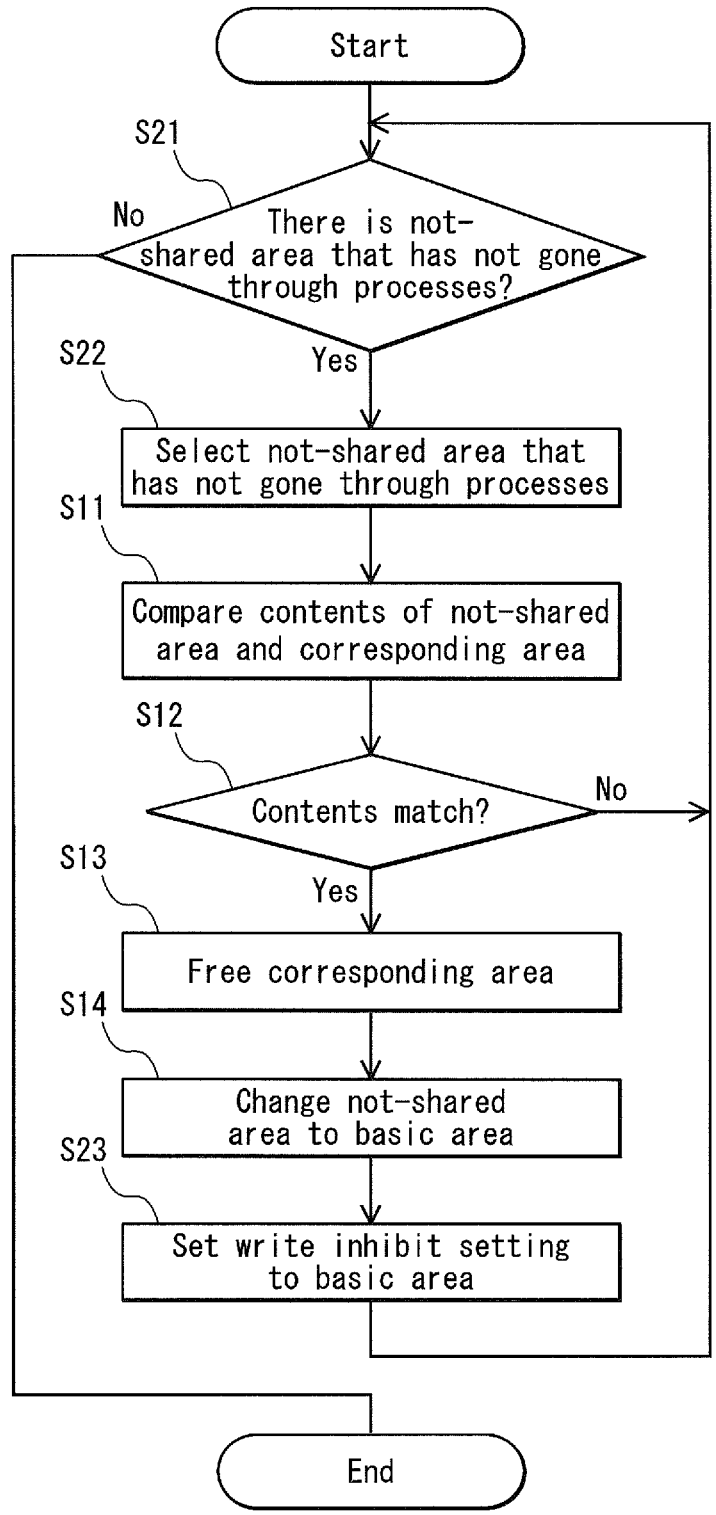
FIG. 11 is a flowchart illustrating the interrupt process executed by the hypervisor 300 when an interrupt from the timer occurs.

The following describes the operation of the virtual computer system 1200 with reference to FIGS. 10 and 11.

First, the exception process executed by the hypervisor 300 when a write inhibit violation occurs is described.

FIG. 10 is a flowchart illustrating the exception process executed by the hypervisor 300 when a write inhibit violation occurs.

Note that the processes (of steps S2, S3, S5 and S6) other than the process executed in step S16 of FIG. 10 are similar to those of the exception process executed by the hypervisor 100 in Embodiment 1 of FIG. 3, and the following description centers on the process of step S16.

In the present embodiment, when a write inhibit violation occurs, the page to which the target virtual computer has attempted to write is always the basic area. Accordingly, when a write inhibit violation occurs, the area assignment unit 311 of the area management unit 310 in the hypervisor 300 copies the basic area (step S2), and updates the target entry in the page table 5 so that the target entry is associated with the area to which the basic area is copied (step S3). In so doing, as described in Embodiment 1, the area assignment unit 311 updates the write inhibit flag of the target entry to "0".

The area assignment unit 311 also changes the basic area to the not-shared basic area and removes the write inhibit setting (step S16). More specifically, the area assignment unit 311 updates the share flag to "0" and the write inhibit flag to "0" in the corresponding entry in the page table 5.

The area assignment unit 311 writes the data, that the target virtual computer has attempted to write to the basic area, to the area to which the basic area has been copied in step S2 (step S5), sets the program counter to indicate an instruction that is to be executed next after a write instruction that has caused the write inhibit violation to occur, in the program that the target virtual computer is running (step S6), and ends the exception process.

Next, a description is given of an interrupt process executed by the hypervisor 300 when an interrupt from the timer occurs.

FIG. 11 is a flowchart illustrating the interrupt process executed by the hypervisor 300 when an interrupt from the timer occurs.

Note that the processes (of steps S11 through S14) other than the processes executed in steps S21, S22 and S23 of FIG. 11 are similar to those of the exception process executed by the hypervisor 100 in Embodiment 1 of FIG. 3, and the following description centers on the processes executed in steps S21, S22 and S23.

When an interrupt from the timer occurs, the area freeing unit 312 of the area management unit 310 in the hypervisor 300 judges whether or not there is, among not-shared areas (the copy area and the not-shared basic area) assigned to one of the virtual computers (for example, the first virtual computer 10A), an area that has not gone through the processes of step S22 and onward explained in the following (step S21).

When it is judged that there is a not-shared area that has not gone through the processes (step S21: Yes), the area freeing unit 312 selects one not-shared area that has not gone through the processes (step S22), compares the content of the selected not-shared area with the content of the corresponding area (step S11), and judges whether or not the both contents match (step S12).

When it is judged that the content of the selected not-shared area does not match the content of the corresponding area (step S12: No), the area freeing unit 312 executes the processes starting with step S21 again, and when it is judged that the both contents match (step S12: Yes), frees the corresponding area, namely, changes the corresponding area to an unused area (step S13).

Also, the area freeing unit 312 changes the not-shared area selected in step S22 to the basic area (step S14), sets a write inhibit setting to the basic area (step S23), and performs the processes starting with step S21 again.

When it is judged that there is no area that has not gone through the processes (step S21: No), the area freeing unit 312 ends the interrupt process.

<<Embodiment 4>>

According to the example provided in Embodiment 3, the area freeing unit 312 of the area management unit 310 in the hypervisor 300 compares the content of each not-shared area assigned to one of the virtual computers (in the above example, the first virtual computer 10A), with the content of the corresponding area at regular intervals.

In general multiple-computing systems, to detect a hardware failure or a software malfunction early, one or more check points are set and intermediate results are checked at the check points.

In view of this, the present embodiment provides an example where one or more check points are set in advance in the program that causes the virtual computers to execute the particular process, and each time executions of the particular process in the virtual computers reach a check point, a comparison is performed. The following describes the example centering on the differences from Embodiment 3.

<Structure>

First, the structure of a virtual computer system 1300 in Embodiment 4 is described.

Figure 12:
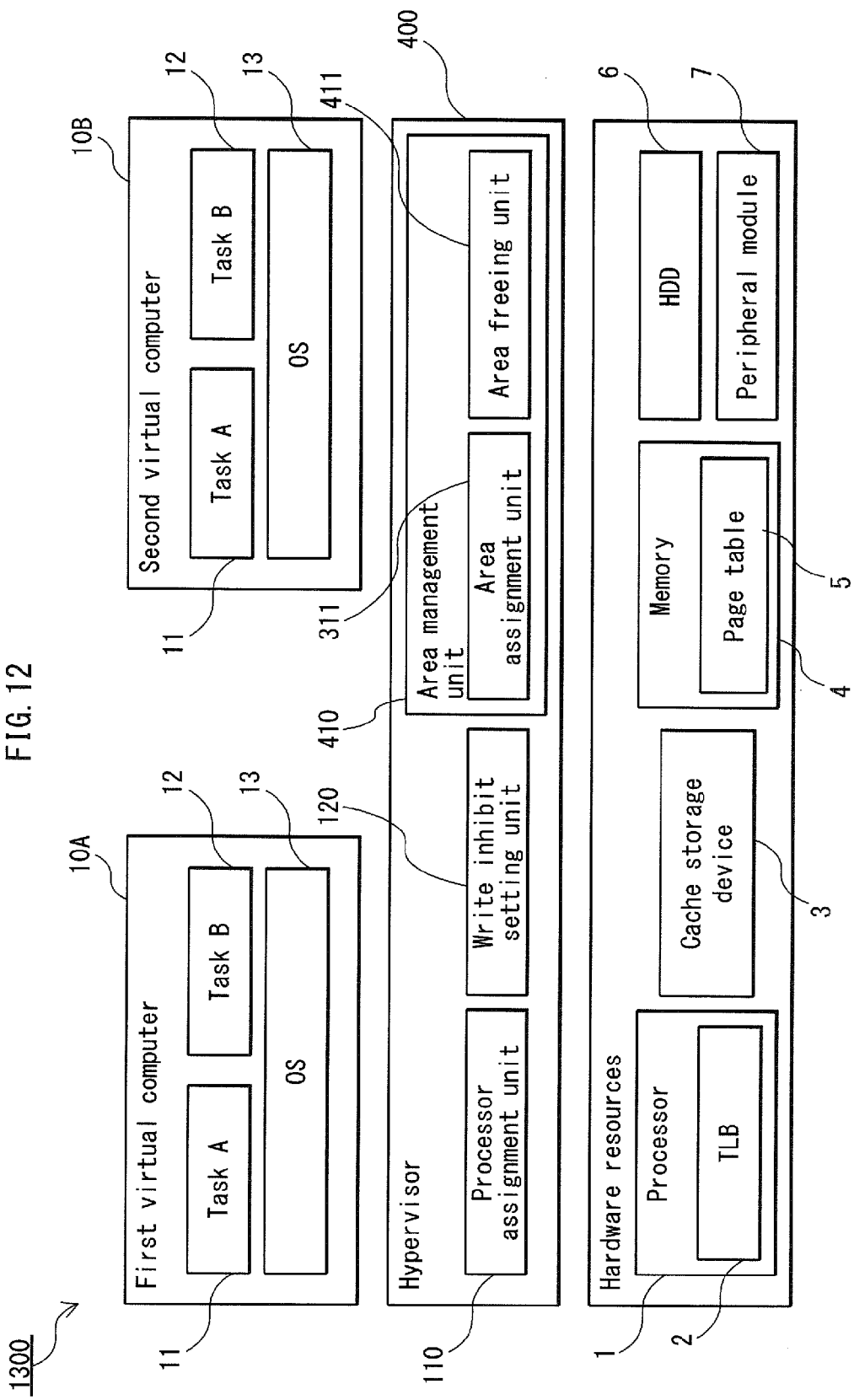
FIG. 12 is a system structure diagram of the virtual computer system 1300 in Embodiment 4.

FIG. 12 is a system structure diagram of the virtual computer system 1300.

As shown in FIG. 12, the virtual computer system 1300 includes a hypervisor 400 instead of the hypervisor 300 provided in the virtual computer system 1200 of Embodiment 3.

The hypervisor 400 includes an area freeing unit 411 included in an area management unit 410, instead of the area freeing unit 312 included in the area management unit 310 of the hypervisor 300.

The area freeing unit 411, as is the case of the area freeing unit 312 in Embodiment 3, has a function to compare the content of each not-shared area (the copy area or the not-shared basic area) assigned to one virtual computer, with the content of the corresponding area assigned to the other virtual computer, but differs from the area freeing unit 312 in that it performs the comparison when executions of the particular process in all the virtual computers reach a same check point.

Note that, as is the case of Embodiment 2, at the check point, a processing routine illustrated in FIG. 13 as explained in the following is called, with a parameter that is data indicating an execution progress having been set to the check point in advance. With use of this parameter, the area management unit 410 can recognize what check point has been reached by an execution of the particular process in a virtual computer.

<Operation>

Figure 13:
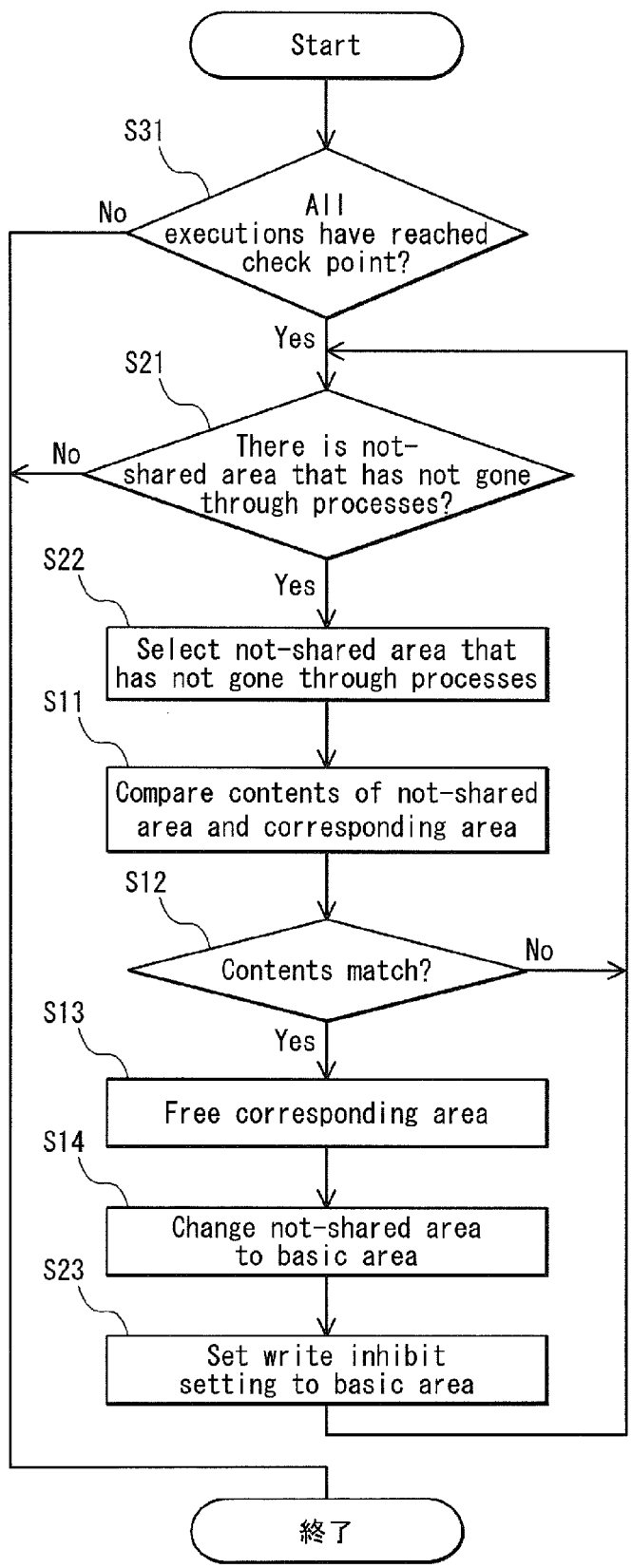
FIG. 13 is a flowchart illustrating the process executed by the hypervisor 400 when executions of the particular process in the virtual computers have reached a check point.

The following describes the operation of the virtual computer system 1300 with reference to FIG. 13.

FIG. 13 is a flowchart illustrating the process executed by the hypervisor 400 when executions of the particular process in the virtual computers have reached a check point.

Note that the processes (of steps S21, S22, S11 through S14, and S23) other than the process executed in step S31 of FIG. 13 are similar to those of the interrupt process executed by the hypervisor 300 in Embodiment 3 of FIG. 11, and the following description centers on the process of step S31.

When an execution of the particular process in one virtual computer reaches a check point, the area management unit 410 of the hypervisor 400 judges whether or not an execution of the particular process in the other virtual computer has reached the check point (step S31).

When it is judged that the execution of the particular process in the other virtual computer has not reached the check point (step S31: No), the area management unit 410 ends the process that is executed when executions of the particular process have reached a check point. Note that the execution of the particular process in the one virtual computer is stopped (suspended) at this check point until the execution of the particular process in the other virtual computer reaches the check point (step S31: Yes) and the processes of steps S21, S22, S11 through S14, and S23 explained in the following are completed.

When it is judged that the execution of the particular process in the other virtual computer has reached the check point (step S31: Yes), the area freeing unit 411 of the area management unit 410 repeats the processes of steps S21 through S23, and when it is judged that there is a not-shared area that has not gone through the processes (step S21: Yes), the area freeing unit 411 ends the process that is executed when executions of the particular process have reached a check point.

Following this, the virtual computers resume the executions of the particular process from an instruction placed immediately after the check point.

<<Supplement>>

Up to now, the virtual computer system of the present invention has been described based on several embodiments. However, the present invention is not limited to the virtual computer system described above in the Embodiments, but may be modified, for example, as follows.

(1) In Embodiment 1, a write inhibit setting is set to the copy area, as explained in step S7 illustrated in FIG. 3. However, the process of step S7 may be omitted.

According to Embodiment 1, the virtual computer system 1000 includes two virtual computers (10A and 10B) and the two virtual computers execute, concurrently, a same particular process. For this reason, the copy area is to be assigned to a virtual computer that is faster in execution progress of the particular process, and the not-shared basic area is to be assigned to a virtual computer that is slower in execution progress of the particular process.

Here, the write inhibit setting has been set to the not-shared basic area. Accordingly, even if the process of step S7 is not performed, when the virtual computer that is slower in execution progress of the particular process attempts to write to the not-shared basic area, a write inhibit violation occurs, and the comparison is performed in step S11 illustrated in FIG. 3.

When the above modification is made such that a write inhibit setting is not set to the copy area, the frequency of occurrence of a write inhibit violation is reduced. This makes it possible to reduce the total amount of memory usage necessary for running the virtual computers, while maintaining the execution speed of the particular process in the virtual computers to some extent.

(2) A write inhibit violation may occur during processes other than the particular process executed by the virtual computers, executed on computers realizing the virtual computer system 1000, 1100, 1200, and 1300, although this is not explained in particular in the above embodiments.

When a write inhibit violation occurs during a process other than the particular process, the following may be performed. That is to say, it is judged whether or not what attempted to write and caused the write inhibit violation to occur is the first virtual computer 10A or the second virtual computer 10B based on, for example, VMID, and only when what attempted to write is the first virtual computer 10A or the second virtual computer 10B, the exception process (see FIGS. 3 and 10) that is executed when a write inhibit violation occurs is executed. Note that, when what attempted to write is neither the first virtual computer 10A nor the second virtual computer 10B, a process, which has been defined in advance in correspondence with a virtual computer or the like that caused the write inhibit violation to occur, is executed.

(3) According to an example described in Embodiment 1, the virtual computer system 1000 includes two virtual computers (10A and 10B), and when one of the two virtual computers (target virtual computer) attempts to write to the basic area, the basic area is changed to the not-shared basic area, as in step S4 illustrated in FIG. 3.

However, when the virtual computer system includes three or more virtual computers, the assignment of the basic area to the three or more virtual computers would change as the area assignment to the target virtual computer is changed one computer by one computer from the basic area to the not-shared basic area, and the process of step S4 illustrated in FIG. 3 needs to be performed only when the number of virtual computers to which the basic area is assigned becomes one.

Accordingly, the number of virtual computers to which the basic area is assigned needs to be managed for each basic area. For this purpose, immediately after the process of step S3 illustrated in FIG. 3, a process of reducing the number of virtual computers to which the basic area, which has been the target of the judgment in step S1, is assigned may be performed, and only when the number of virtual computers is one after this process, the process of step S4 illustrated in FIG. 3 may be performed.

As another method for the above, immediately after the process of step S3 illustrated in FIG. 3, it may be judged whether or not there is an entry in the page table 5 having the same physical address as the target entry in step S3, among corresponding entries having the same logical address as the target entry in step S3, and only when there is no other entry in the page table 5 having the same physical address as the target entry in step S3, the process of step S4 illustrated in FIG. 3 may be performed.

(4) According to an example described in Embodiment 1, as shown in step S13 illustrated in FIG. 3, the corresponding area, among the not-shared area and the corresponding area that are compared with each other, is freed. However, not limited to this, the area to be freed may be reversed. That is to say, the area assignment to the target virtual computer may be changed from the not-shared area to the corresponding area, and the not-shared area may be freed.

(5) According to examples described in the above embodiments, the write inhibit setting unit 120 sets the write inhibit setting. However, not limited to this, the area assignment unit and the area freeing unit may directly set the write inhibit setting.

Also, according to examples described in the above embodiments, the area assignment unit and the area freeing unit directly remove the write inhibit setting. However, the write inhibit setting may be removed by the write inhibit setting unit 120. That is to say, either the write inhibit setting unit 120 or the area assignment unit and the area freeing unit may have the function to set and remove the write inhibit setting.

(6) According to an example described in Embodiment 2, as illustrated in FIG. 8B, both the frequency and the assignment rate are different between the processors 1 and 8. However, not limited to this, either or both of them may be the same between the processors 1 and 8.

Also, according to an example described in Embodiment 2, two processors (processor cores) are used. However, not limited to this, three or more processors may be used. In that case, the rate that can be assigned to the clock frequency of the processors and the execution of the particular process may be the same or different.

Also, according to an example described in Embodiment 2, two processors are used to run two virtual computers. However, not limited to this, more virtual computers than processors in number may be run. In that case, the assignment of the processors to each virtual computer may be as follows.

That is to say, when, for example, three virtual computers are run by using two processors, one processor (processor core) may be assigned exclusively to a virtual computer that is slowest in the execution progress of the particular process, and to the other two virtual computers, the remaining one processor (processor core) may be assigned by time sharing manner. This structure may be further modified such that, when the remaining one processor is assigned to the remaining two virtual computers, the time period for which the processor is assigned may be varied depending on the execution progress of the particular process in each of the remaining two virtual computers.

Note that, here, as one example, the number of processors is two, and the number of virtual computers is three. However, not limited to this, as far as the number of virtual computers is greater than the number of processors (two or more), the number of virtual computers and the number of processors are not limited to those in this example, but may be set appropriately according to this modification.

Also, when, for example, two or more virtual computers are run by using one processor, the time period for which the processor is assigned may be varied depending on the execution progress of the particular process in each virtual computer. That is to say, the processor may be assigned with priority to a virtual computer that is slower in execution progress of the particular process.

(7) According to an example described in Embodiment 2, as illustrated in FIG. 8B, the performance of the processor is evaluated based on the product of the frequency and the assignment rate. However, not limited to this, other index may be used to evaluate the performance of the processor. Alternatively, the designer of the virtual computer system may define the performance levels of the processors in advance.

(8) According to examples of the page table 5 illustrated in FIG. 2 and the progress management table 20 illustrated in FIG. 8A, the VMIDs of the virtual computers are represented by values "1" and "2". However, these are merely examples, and as far as the VMID is information that can identify each virtual computer, any format may be used. For example, values that are different from those illustrated in the drawings may be used, or they may be characters, character sequences or the like.

Furthermore, according to the example of the page table 5 illustrated in FIG. 2, the share flag and the write inhibit flag are represented by values "0" and "1". However, as is the case of the VMID, as far as they are information that can identify the two statuses, any format may be used.

Also, according to the example of the page table 5, the size of one page is 4 KB. However, not limited to this, the size of one page may be larger or smaller than 4 KB.

Furthermore, in the example of the assignment management table 30 illustrated in FIG. 8B, the processor IDs of the processors are represented by values "1" and "2". However, as is the case of the VMID, as far as they are information that can identify the two processors, any format may be used.

Also, according to the example of the assignment management table 30, each processor is associated with the processor ID 31, frequency 32, assignment rate 33, and VMID 34. However, among these, the processor ID 31 and the VMID 34 are indispensable data items for the assignment management table 30, and the frequency 32 and the assignment rate 33 may be managed in another table in association with processor IDs.

(9) According to examples of above embodiments, the particular process executed by the virtual computers (10A and 10B) is a process realized by two tasks (tasks A11 and B12). However, the number of tasks may be larger or smaller than two.

(10) According to the example of Embodiment 3, the processes of steps S5 and S6 illustrated in FIG. 10 are performed. However, not limited to this, the exception process executed by the hypervisor 300 when a write inhibit violation occurs may be ended without performing the processes of steps S5 and S6.

This is because, in that case, the virtual computer that executed a write instruction that caused the exception to occur executes the same write instruction again, but the write inhibit setting has not been set to the area to which the basic area was copied in step S2, and thus the writing can be completed without occurrence of a write inhibit violation.

(11) In each of the above embodiments, the process of the hypervisor may be realized as a process of one or more virtual computers that are not the first virtual computer 10A and the second virtual computer 10B. Alternatively, the process may be realized as a process of an OS which is obtained by improving the OS 13.

(12) Part or all of the structural elements described in the Embodiments may be realized by an integrated circuit implemented on one chip or a plurality of chips, may be realized by a computer program, or may be realized in any other form.

Each structural element described in the Embodiments realizes its function when it operates in cooperation with the processor provided in the virtual computer system.

(13) A program for causing a processor to execute the process of the hypervisor described in the Embodiments (see FIGS. 3, 10, 11 and 13) may be recorded on a recording medium, and circulated and/or distributed via the recording medium, or may be circulated and/or distributed via various types of communication paths or the like. Such recording mediums include an IC card, optical disc, flexible disc, ROM, and flash memory. A program circulated and/or distributed is stored, for use, in a memory or the like that can be read by a processor provided in the device, and as the processor executes the program, each function of the hypervisor described in the Embodiments is realized.

(14) Part or all of the above modifications (1) through (13) may be combined, for application, with a virtual computer system in the Embodiments.

(15) The following further describes the structure, modification, and effects of the virtual computer system in one embodiment of the present invention.

(a) One aspect of the present invention provides a virtual computer system having a plurality of virtual computers that are realized when a processor executes a program stored in a memory, the virtual computer system comprising: an area assignment unit operable to, when a virtual computer among the plurality of virtual computers attempts to perform writing to a basic area which is an area provided in the memory and is assigned to and shared by the plurality of virtual computers, change an area assignment to the virtual computer from the basic area to a copy area which is an area provided in the memory to which a content of the basic area is copied and the writing is performed, while keeping the basic area to be assigned to the plurality of virtual computers except for the virtual computer; and an area freeing unit operable to, when a predetermined condition, which defines a trigger to perform a comparison between the content of the basic area and a content of each of one or more copy areas, is satisfied, perform the comparison, and when the comparison results in indication of a match between the content of the basic area and a content of at least one copy area among the one or more copy areas, change area assignment to one or more virtual computers, to which have been assigned one or more other areas than one area among the areas whose contents match each other, from the one or more other areas to the one area, and free the one or more other areas.

According to the above virtual computer system, the area assignment to the one or more virtual computers, to which have been assigned one or more other areas than one area among the areas whose contents match each other, is changed from the one or more other areas to the one area, and the one or more other areas are freed. With this structure, it is possible to reduce the total amount of memory usage necessary for running the virtual computers.

(b) In the above virtual computer system, the basic area and the one or more copy areas may be pages indicated by different physical addresses, the pages being managed in a page table stored in the memory, and the plurality of virtual computers execute a particular process associated with a same program.

According to the above virtual computer system, the plurality of virtual computers execute a particular process associated with a same program. Accordingly, when the execution progresses of the particular process in the plurality of virtual computers are in the same level, there is a high possibility that the content of the basic area matches the content of the at least one copy area, and the one or more other areas other than the one area among the areas whose contents match each other are freed. With this structure, it is possible to reduce the total amount of memory usage necessary for running the virtual computers.

(c) In the above virtual computer system, the predetermined condition may be that a write instruction to perform writing either to the basic area or to one of the one or more copy areas, to which one virtual computer has been assigned, is executed by the one virtual computer.

According to the above virtual computer system, when a write instruction is executed and writing is performed to one area, the content of the one area changes. Thus, with the above structure, it is possible to perform an efficient comparison at a timing when there is a possibility that the content of the basic area matches the content of the at least one copy area.

(d) In the above virtual computer system, the area assignment unit, when changing the area assignment to the virtual computer from the basic area to the copy area, may make a setting in the page table to inhibit writing to the copy area, and the predetermined condition is that a write inhibit violation occurs when a virtual computer, to which the copy area has been assigned, attempts to perform writing to the copy area, and when the predetermined condition is satisfied, the area freeing unit performs the writing to the copy area and then performs the comparison.

According to the above virtual computer system, it is possible to use a conventional mechanism called an interrupt (exception) that occurs when a write inhibit violation occurs, and with the interrupt (exception), it is possible to detect that a virtual computer has attempted to write to a copy area. With this structure, it is possible to perform a comparison at a timing when there is a possibility that the content of the basic area matches the content of the copy area that has changed after the writing was performed.

(e) The above virtual computer system may further comprise: a write inhibit setting unit operable to make a setting in the page table to inhibit writing to the basic area, wherein the predetermined condition is that a write inhibit violation occurs when the basic area has been assigned to one virtual computer and the one virtual computer attempts to perform writing to the basic area, and when the predetermined condition is satisfied, the area freeing unit performs the writing to the basic area and then performs the comparison.

According to the above virtual computer system, it is possible to use a conventional mechanism called an interrupt (exception) that occurs when a write inhibit violation occurs, to perform the comparison between the content of the basic area and the content of each of the one or more copy areas, in the state where the content of the basic area has been changed after a writing was performed, and the number of virtual computers assigned to the basic area is one.

(f) In the above virtual computer system, in the page table, the basic area, which has been assigned to and shared by the plurality of virtual computers, may be set to a shared status indicating that an area is shared by two or more virtual computers, the area assignment unit, when changing the area assignment to the virtual computer from the basic area to the copy area, sets the copy area to a not-shared status indicating that an area is not shared by virtual computers, and when the number of virtual computers sharing the basic area, excluding the virtual computer, becomes one, sets the basic area to the not-shared status in the page table, and the predetermined condition is that any virtual computer attempts to write to an area that is set to the not-shared status in the page table, and when the predetermined condition is satisfied, the area freeing unit performs the writing to the area that is set to the not-shared status, then performs the comparison, and when changing the area assignment to the one or more virtual computers, to which the one or more other areas among the areas whose contents match each other have been assigned, from the one or more other areas to the one area, sets, in the page table, the one area to the shared status.

According to the above virtual computer system, the comparison is performed at a timing when writing has been performed to one or more areas in the not-shared status (namely, the one or more copy areas or the basic area in the not-shared status), and the content of each of the one or more copy areas or the basic area has been changed. Thus, with the above structure, it is possible to perform an efficient comparison at a timing when there is a possibility that the content of the basic area matches the content of the at least one copy area.

(g) The above virtual computer system may further comprise: a write inhibit setting unit operable to make a setting in the page table to inhibit writing to the basic area, wherein in the page table, the basic area, which has been assigned to and shared by the plurality of virtual computers, is set to a shared status indicating that an area is shared by two or more virtual computers, the area assignment unit, when changing the area assignment to the virtual computer from the basic area to the copy area, sets the copy area to a not-shared status indicating that an area is not shared by virtual computers, and when the number of virtual computers, excluding the virtual computer, sharing the basic area becomes one, sets the basic area to the not-shared status in the page table, and the predetermined condition is that a write inhibit violation occurs when a virtual computer, to which the basic area, which is set to the not-shard status in the page table, is assigned, attempts to write to the basic area, and when the predetermined condition is satisfied, the area freeing unit performs the writing to the basic area having been set to the not-shared status, then performs the comparison, and when changing the area assignment to the one or more virtual computers, to which the one or more other areas among the areas whose contents match each other have been assigned, from the one or more other areas to the one area, sets, in the page table, the one area to the shared status.

According to the above virtual computer system, it is possible to use a conventional mechanism called an interrupt (exception) that occurs when a write inhibit violation occurs, to detect that a virtual computer has attempted to write to the basic area in the not-shared status. With this structure, it is possible to perform a comparison at a timing when there is a possibility that the content of the basic area in the not-shared status, to which writing has been performed and the content has been changed, matches the content of the at least one copy area.

(h) In the above virtual computer system, the predetermined condition may be that a predetermined time period has passed since the comparison was performed last time.

According to the above virtual computer system, the comparison is performed each time the predetermined time period passes, and the one or more other areas other than the one area among the areas whose contents match each other are freed. With this structure, by setting the predetermined time period appropriately, it is possible to reduce the total amount of memory usage necessary for running the virtual computers, while reducing decrease in the execution speed of the particular process due to the comparison.

(i) In the above virtual computer system, check points for checking intermediate results may have been set at predetermined execution positions in the particular process, and the predetermined condition is that, in the plurality of virtual computers, the predetermined execution positions in the particular process have reached the check points.

Here, the virtual computers execute, concurrently, the particular process associated with the same program. Thus, unless an abnormality such as a hardware failure or a software malfunction has occurred, the content of the basic area should match the content of each copy area when the execution positions in the particular process of the virtual computers reach the check points.

According to the above virtual computer system, the comparison is performed at a timing when the content of the basic area should match the content of each copy area. Therefore, with the above structure, it is possible to reduce the total amount of memory usage necessary for running the virtual computers, while reducing decrease in the execution speed of the particular process due to the comparison.

(j) In the above virtual computer system, when the one or more copy areas include a plurality of copy areas, the area freeing unit may change the area assignment from the one or more other areas to the one area only when the basic area and all of the copy areas match each other, and free the one or more other areas.

Here, the virtual computers execute, concurrently, the particular process associated with the same program. Thus, when the content of the basic area does not match the content of any of the copy areas, there is a high possibility that, after the detection of the mismatch, a writing is performed to these areas again. That is to say, when an area is freed at a timing when the content of the basic area matches a part of the copy areas, there is a high possibility that assignment of the copy areas is changed.

According to the above virtual computer system, the area is freed at a timing when the content of the basic area match the content of each of the copy areas. Therefore, with the above structure, it is possible to reduce the total amount of memory usage necessary for running the virtual computers, while reducing decrease in the execution speed of the particular process due to change of area assignment and freeing of an area.

(k) The above virtual computer system may further comprise: a progress management unit operable to identify, among the plurality of virtual computers, a virtual computer that is slowest in execution progress of the particular process; and a processor assignment unit operable to assign the processor, with priority, to the virtual computer identified as slowest in execution progress by the progress management unit.

According to the above virtual computer system, the processor is assigned, with priority, to the virtual computer identified as slowest in execution progress. With this structure, it is possible to increase the possibility that the execution progresses of the particular process in the virtual computers become approximately the same and the content of the basic area matches the content of each copy area. Therefore, with this structure, it is possible to reduce the total amount of memory usage necessary for running the virtual computers.

(l) In the above virtual computer system, the processor may include a plurality of processor cores, the plurality of virtual computers include at least three virtual computers, and the processor assignment unit assigns one processor core exclusively to the virtual computer identified as slowest in execution progress by the progress management unit.

According to the above virtual computer system, the virtual computer identified as slowest in execution progress operates using one processor core exclusively. With this structure, it is possible to increase the possibility that the execution progresses of the particular process in the virtual computers become approximately the same and the content of the basic area matches the content of each copy area. Therefore, with this structure, it is possible to reduce the total amount of memory usage necessary for running the virtual computers.

(16) The memory and the processor included in the virtual computer system of the present invention correspond to the memory 4 and the processor 1, 8 included in the virtual computer system of the embodiments. The plurality of virtual computers included in the virtual computer system of the present invention correspond to the first virtual computer 10A and the second virtual computer 10B included in the virtual computer system of the embodiments. The area assignment unit, the area freeing unit, the write inhibit setting unit, the progress management unit, and the processor assignment unit included in the virtual computer system of the present invention correspond to the hypervisor included in the virtual computer system of the embodiments.

The virtual computer system of the present invention is used to realize a multiple-computing system that uses a plurality of virtual computers.

REFERENCE SIGNS LIST

1, 8 processor
3, 9 cache storage device
4 memory
5 page table
7 peripheral module
10A, 10B virtual computer
100, 200, 300, 400 hypervisor
110, 220 processor assignment unit
120 write inhibit setting unit
130, 310, 410 area management unit
131, 311 area assignment unit
132, 312, 411 area freeing unit
210 progress management unit
1000, 1100, 1200, 1300 virtual computer system

The invention claimed is:

1. A virtual computer system having a plurality of virtual computers that are realized when a processor executes a program stored in a memory, the virtual computer system comprising:
    an area freeing unit configured to, when a predetermined condition is satisfied, perform a comparison among contents of areas in the memory assigned to the plurality of virtual computers, and when the comparison results in indication of a match between a content of a first area assigned to a virtual computer and a content of a second area assigned to at least one virtual computer other than the virtual computer, change area assignment by assigning the first area to the at least one virtual computer in place of the second area, and free the second area,
    wherein the areas in the memory include
        a basic area which is the first area, and
        one or more copy areas, one of which is assigned to one virtual computer among the plurality of virtual computers when the one virtual computer attempts to perform writing to the basic area, a content of the basic area being copied to the one of the one or more copy areas,
    the basic area and the one or more copy areas are respectively pages managed in a page table stored in the memory,
    the virtual computer system further comprises
    an area assignment unit configured to, when the one virtual computer attempts to perform writing to the basic area in a state where the basic area is assigned to and shared by the plurality of virtual computers, change area assignment by assigning any of the one or more copy areas to the one virtual computer in place of the basic area, and keep the basic area to be assigned to the plurality of virtual computers except for the one virtual computer; and
    a write inhibit setting unit operable to make a setting in the page table to inhibit writing to the basic area,
    wherein, in the page table, the basic area, which has been assigned to and shared by the plurality of virtual computers, is set to a shared status indicating that an area is shared by two or more virtual computers,
    the area assignment unit, when changing the area assignment to the virtual computer from the basic area to the copy area, sets the copy area to a not-shared status indicating that an area is not shared by virtual computers, and when the number of virtual computers, excluding the virtual computer, sharing the basic area becomes one, sets the basic area to the not-shared status in the page table, and
    the predetermined condition is that a write inhibit violation occurs when a virtual computer, to which the basic area, which is set to the not-shared status in the page table, is assigned, attempts to write to the basic area, and when the predetermined condition is satisfied, the area freeing unit performs the writing to the basic area having been set to the not-shared status, then performs the comparison, and when changing the area assignment to the one or more virtual computers to which the one or more other areas among the areas whose contents match each other have been assigned, sets, in the page table, the one area to the shared status.

2. A virtual computer system having a plurality of virtual computers that are realized when a processor executes a program stored in a memory, the virtual computer system comprising:
    an area freeing unit configured to, when a predetermined condition is satisfied, perform a comparison among contents of areas in the memory assigned to the plurality of virtual computers, and when the comparison results in indication of a match between a content of a first area assigned to a virtual computer and a content of a second area assigned to at least one virtual computer other than the virtual computer, change area assignment by assigning the first area to the at least one virtual computer in place of the second area, and free the second area,
    wherein
    the areas in the memory include
        a basic area which is the first area, and
        one or more copy areas, one of which is assigned to one virtual computer among the plurality of virtual computers when the one virtual computer attempts to perform writing to the basic area, a content of the basic area being copied to the one of the one or more copy areas,
    the basic area and the one or more copy areas are respectively pages managed in a page table stored in the memory,
    the virtual computer system further comprises
    an area assignment unit configured to, when the one virtual computer attempts to perform writing to the basic area in a state where the basic area is assigned to and shared by the plurality of virtual computers, change area assignment by assigning any of the one or more copy areas to the one virtual computer in place of the basic area, and keep the basic area to be assigned to the plurality of virtual computers except for the one virtual computer, in the page table, the basic area, which has been assigned to and shared by the plurality of virtual computers, is set to a shared status indicating that an area is shared by two or more virtual computers, the area assignment unit, when changing the area assignment to the virtual computer from the basic area to the copy area, sets the copy area to a not-shared status indicating that an area is not shared by virtual computers, and when the number of virtual computers sharing the basic area, excluding the virtual computer, becomes one, sets the basic area to the not-shared status in the page table, and wherein the predetermined condition is that any virtual computer attempts to write to an area that is set to the not-shared status in the page table, and when the predetermined condition is satisfied, the area freeing unit performs the writing to the area that is set to the not-shared status, then performs the comparison, and when changing the area assignment to the one or more virtual computers to which the one or more other areas among the areas whose contents match each other have been assigned, sets, in the page table, the one area to the shared status.

3. The virtual computer system of claim 2, wherein the predetermined condition is that a write instruction to perform writing either to the basic area or to one of the one or more copy areas, to which one virtual computer has been assigned, is executed by the one virtual computer.

4. The virtual computer system of claim 2, wherein the area assignment unit, when changing the area assignment to the virtual computer from the basic area to the copy area, makes a setting in the page table to inhibit writing to the copy area, and the predetermined condition is that a write inhibit violation occurs when a virtual computer, to which the copy area has been assigned, attempts to perform writing to the copy area, and when the predetermined condition is satisfied, the area freeing unit performs the writing to the copy area and then performs the comparison.

5. The virtual computer system of claim 2 further comprising:

a write inhibit setting unit operable to make a setting in the page table to inhibit writing to the basic area, wherein the predetermined condition is that a write inhibit violation occurs when the basic area has been assigned to one virtual computer and the one virtual computer attempts to perform writing to the basic area, and when the predetermined condition is satisfied, the area freeing unit performs the writing to the basic area and then performs the comparison.

6. The virtual computer system of claim 2, wherein the predetermined condition is that a predetermined time period has passed since the comparison was performed last time.

7. The virtual computer system of claim 2, wherein the plurality of virtual computers execute a particular process associated with a same program.

8. The virtual computer system of claim 7, wherein check points for checking intermediate results have been set at predetermined execution positions in the particular process, and the predetermined condition is that, in the plurality of virtual computers, the predetermined execution positions in the particular process have reached the check points.

9. The virtual computer system of claim 7 further comprising:

a progress management unit operable to identify, among the plurality of virtual computers, a virtual computer that is slowest in execution progress of the particular process; and a processor assignment unit operable to assign the processor, with priority, to the virtual computer identified as slowest in execution progress by the progress management unit.

10. The virtual computer system of claim 9, wherein the processor includes a plurality of processor cores, the plurality of virtual computers include at least three virtual computers, and the processor assignment unit assigns one processor core exclusively to the virtual computer identified as slowest in execution progress by the progress management unit.

11. The virtual computer system of claim 2, wherein when the one or more copy areas include a plurality of copy areas, the area freeing unit changes the area assignment and free the one or more other areas.

12. The virtual computer system of claim 2, wherein the areas assigned to the plurality of virtual computers are respectively pages managed in a page table stored in the memory, and the area freeing unit changes the area assignment and frees the second area by updating the page table.

13. An area management method for managing areas provided in a memory in a virtual computer system having a plurality of virtual computers that are realized when a processor executes a program stored in the memory, the areas in the memory include a basic area which is the first area, and one or more copy areas, one of which is assigned to one virtual computer among the plurality of virtual computers when the one virtual computer attempts to perform writing to the basic area, a content of the basic area being copied to the one of the one or more copy areas, the basic area and the one or more copy areas are respectively pages managed in a page table stored in the memory, the virtual computer system further comprises an area assignment unit configured to, when the one virtual computer attempts to perform writing to the basic area in a state where the basic area is assigned to and shared by the plurality of virtual computers, change area assignment by assigning any of the one or more copy areas to the one virtual computer in place of the basic area, and keep the basic area to be assigned to the plurality of virtual computers except for the one virtual computer, in the page table, the basic area, which has been assigned to and shared by the plurality of virtual computers, is set to a shared status indicating that an area is shared by two or more virtual computers, the area assignment unit, when changing the area assignment to the virtual computer from the basic area to the copy area, sets the copy area to a not-shared status indicating that an area is not shared by virtual computers, and when the number of virtual computers sharing the basic area, excluding the virtual computer, becomes one, sets the basic area to the not-shared status in the page table, the area management method comprising:

an area freeing step of, when a predetermined condition is satisfied, performing a comparison among contents of areas in the memory assigned to the plurality of virtual computers, and when the comparison results in indication of a match between a content of a first area assigned to a virtual computer and a content of a second area assigned to at least one virtual computer other than the virtual computer, changing area assignment by assigning the first area to the at least one virtual computer in place of the second area, and freeing the second area, wherein the predetermined condition is that any virtual computer attempts to write to an area that is set to the not-shared status in the page table, and when the predetermined condition is satisfied, the area freeing unit performs the writing to the area that is set to the not-shared status, then performs the comparison, and when changing the area assignment to the one or more virtual computers to which the one or more other areas among the areas whose contents match each other have been assigned, sets, in the page table, the one area to the shared status.

14. A non-transitory computer-readable recording medium storing a program for causing a processor to execute an area management process of managing areas provided in a memory in a virtual computer system having a plurality of virtual computers that are realized when the processor executes the program stored in the memory, the areas in the memory include
a basic area which is the first area, and
one or more copy areas, one of which is assigned to one virtual computer among the plurality of virtual computers when the one virtual computer attempts to perform writing to the basic area, a content of the basic area being copied to the one of the one or more copy areas, the basic area and the one or more copy areas are respectively pages managed in a page table stored in the memory, the virtual computer system further comprises an area assignment unit configured to, when the one virtual computer attempts to perform writing to the basic area in a state where the basic area is assigned to and shared by the plurality of virtual computers, change area assignment by assigning any of the one or more copy areas to the one virtual computer in place of the basic area, and keep the basic area to be assigned to the plurality of virtual computers except for the one virtual computer, in the page table, the basic area, which has been assigned to and shared by the plurality of virtual computers, is set to a shared status indicating that an area is shared by two or more virtual computers, the area assignment unit, when changing the area assignment to the virtual computer from the basic area to the copy area, sets the copy area to a not-shared status indicating that an area is not shared by virtual computers, and when the number of virtual computers sharing the basic area, excluding the virtual computer, becomes one, sets the basic area to the not-shared status in the page table, the area management process comprising:

an area freeing step of, when a predetermined condition is satisfied, performing a comparison among contents of areas in the memory assigned to the plurality of virtual computers, and when the comparison results in indication of a match between a content of a first area assigned to a virtual computer and a content of a second area assigned to at least one virtual computer other than the virtual computer, changing area assignment by assigning the first area to the at least one virtual computer in place of the second area, and freeing the second area, wherein the predetermined condition is that any virtual computer attempts to write to an area that is set to the not-shared status in the page table, and when the predetermined condition is satisfied, the area freeing unit performs the writing to the area that is set to the not-shared status, then performs the comparison, and when changing the area assignment to the one or more virtual computers to which the one or more other areas among the areas whose contents match each other have been assigned, sets, in the page table, the one area to the shared status.

* * * * *